(12) United States Patent
Yata

(10) Patent No.: US 7,561,790 B2
(45) Date of Patent: Jul. 14, 2009

(54) AUTO FOCUS SYSTEM

(75) Inventor: Kunio Yata, Saitama (JP)

(73) Assignee: Fujinon Corporation, Saitama-Shi, Saitama (JP)

(*) Notice: Subject to any disclaimer, the term of this patent is extended or adjusted under 35 U.S.C. 154(b) by 568 days.

(21) Appl. No.: 11/317,075

(22) Filed: Dec. 27, 2005

(65) Prior Publication Data

US 2006/0140612 A1    Jun. 29, 2006

(30) Foreign Application Priority Data

Dec. 28, 2004  (JP) ............................. 2004-380088
Mar. 22, 2005  (JP) ............................. 2005-081959
Mar. 22, 2005  (JP) ............................. 2005-081960

(51) Int. Cl.
*G03B 13/00*    (2006.01)
*G03B 3/00*     (2006.01)
*G03B 13/24*    (2006.01)
*G03B 15/00*    (2006.01)

(52) U.S. Cl. ..................... 396/124; 396/127; 396/150; 348/353

(58) Field of Classification Search ................. 396/124, 396/89, 103, 121, 125, 127, 131, 150; 348/345, 348/347, 349, 353
See application file for complete search history.

(56) References Cited

U.S. PATENT DOCUMENTS 5,204,749 A    4/1993   Toyama et al.
6,417,883 B1 * 7/2002   Kaneda ....................... 348/350

FOREIGN PATENT DOCUMENTS

| EP | 0 687 922 A2 | 12/1995 |
| JP | 4-126473 A | 4/1992 |
| JP | 4-132374 A | 5/1992 |
| JP | 2002-365519 A | 12/2002 |
| WO | WO-02/099496 A1 | 12/2002 |

* cited by examiner

*Primary Examiner*—Rochelle-Ann J Blackman
(74) *Attorney, Agent, or Firm*—Birch, Stewart, Kolasch & Birch, LLP

(57) ABSTRACT

The present invention provides an auto focus system capable of having an AF area which is a target range of auto focus (AF) automatically follow a follow-up target subject as a focusing target, wherein the system changes a size of a range for capturing an image of the follow-up target subject as a reference pattern image out of the range of a photographing image according to a target subject distance and a focal length of a photographing lens so as to appropriately perform detection of the image of the target subject and automatic follow-up of the AF area even in the case where the size of the image of the target subject in the photographing image of the camera changes such as the case where the distance between the camera and the follow-up target subject changes or the case where the focal length of the photographing lens (optical system of the camera) changes.

13 Claims, 14 Drawing Sheets

IMAGE A

IMAGE B

DIFFERENCE IMAGE C

DIFFERENCE IMAGE C

DIFFERENCE IMAGE C

IMAGE A

IMAGE B

DIFFERENCE IMAGE C

DIFFERENCE IMAGE C

DIFFERENCE IMAGE C

PHOTOGRAPHING IMAGE

AUTO FOCUS SYSTEM

BACKGROUND OF THE INVENTION

1. Field of the Invention

The present invention relates to an auto focus system, and in particular, to the auto focus system capable of focusing while following a desired target subject by automatically moving a target position (range) of an auto focus (AF) in a photographing range of a camera.

2. Description of the Related Art

As for an image pickup system such as a TV camera which converts an image of a subject to an electrical signal (image signal) with an image pickup device (CCD or the like), a contrast method is generally adopted as an auto focus (hereafter, referred to as AF) method. The contrast method is the method whereby a contrast of a subject image is detected from the image signal captured by an image pickup device and a focus of a photographing lens is controlled to obtain the highest contrast so as to automatically focus on the best focusing state (focused state).

In many cases, the AF such as the contrast method targets only the subject in a part of a photographing range of the camera rather than targeting the entirety of the subject in the photographing range. The AF of the contrast method extracts the image signals in the range targeted by the AF out of the image signals captured by the entire image pickup area of the image pickup device, and controls the focus to obtain the highest contrast of the image signals in the extracted range so as to limit the target of the AF only to the subject in a part of the range. This specification describes as an AF area the range of the subject targeted by the AF out of the photographing range of the camera or an image range of the subject targeted by the AF of the entire range of a photographing image (screen thereof) of the camera, and describes a frame showing an outline of the AF area as an AF frame.

In the case where a single AF area is fixedly set up at a predetermined position in the photographing range, a rectangular AF area is fixedly set up at the center of the photographing range as a standard. However, there is also the known case where the position of the AF area is changeable by an operation of an operator (refer to Japanese Patent Application Laid-Open No. 2002-365519).

SUMMARY OF THE INVENTION

In the case where an AF area is rendered changeable to a desired position, it is necessary for an operator, if a target subject to be focused on is an object moving in a photographing range, to move the position of the AF area to fit movement of the target subject by manipulating an operating device such as a trackball or a joystick. For that reason, there is a problem that the operation requires trouble and attention.

Therefore, it is effective to have the AF area automatically follow the moving target subject so that the operator no longer has the trouble of manipulating the position of the AF area. As for the method of having the AF area automatically follow a desired target subject, it is thinkable to apply a technique of pattern matching (normalized correlation) used for product inspection and the like.

According to this method, an image of the target subject to be followed is stored first as the image of a reference pattern (reference pattern image). For instance, a rectangular frame (reference pattern frame) is displayed on a screen such as a view finder for showing a photographing image (video) of a camera, and the position of the reference pattern frame is rendered changeable by a predetermined operating device. And if the operator manipulates the operating device to match the reference pattern frame with the position of the target subject to be followed and then provides an instruction to store it, the image in the reference pattern frame at that time is stored as the reference pattern image.

If the reference pattern image is stored, a follow-up process is started and a pattern matching process is performed to the photographing images sequentially obtained from the camera so as to detect the image matching with the reference pattern image. And the position of the AF area is moved to fit the position of the image matching with the reference pattern image. Thus, it is possible to have the AF area automatically follow the target subject stored as the reference pattern image.

As for the above-mentioned automatic follow-up of the AF area, there are the cases where, even if the same target subject, the pattern of the image of the target subject changes significantly when it moves. For instance, in the case where a face of a person is the target subject, the pattern of the image of the target subject changes significantly when the person changes a direction of the face. In this case, there is a possibility that the reference pattern image stored initially no longer matches with the image of the target subject in the photographing images taken consecutively by the camera. Therefore, on detecting the image matching with the reference pattern image in newly obtained photographing images for instance, it is possible, by capturing the detected image and updating it as a new reference pattern image, to have the pattern of the reference pattern image changed, even if the pattern of the image of the target subject changes, along with that change so as to detect the image of the target subject appropriately.

If a distance between the camera and the target subject changes or a zoom factor (focal length) of a photographing lens changes, however, the size of the image of the target subject in the photographing image changes. Therefore, there is a problem that it becomes difficult to detect the image of the target subject either in the case of capturing the reference pattern image from a new photographing image and updating it or in the case of performing no such updating.

For instance, when the target subject moves backward or when the focal length of the photographing lens becomes shorter, the image of the target subject becomes smaller in the photographing image. Assuming such cases, when capturing the reference pattern image from the new photographing image and updating it, the image of the target subject in the reference pattern frame becomes smaller so that a lot of images other than the target subject such as the background are included in the updated reference pattern image. If a lot of images other than the target subject are included in the reference pattern image, correlation values in the pattern matching process become smaller so that it becomes difficult to detect the target subject.

In the case where the above-mentioned updating of the reference pattern image is not performed, that is, in the case where the reference pattern image is captured from the photographing image and stored just once, the size of the image of the target subject in the reference pattern image becomes different from the size of the image of the target subject in the photographing image if the image of the target subject becomes smaller (or larger) in the photographing image. For that reason, it becomes difficult to detect the target subject in the pattern matching process as described above.

The present invention has been made in view of such circumstances, and an object thereof is to provide an auto focus system capable of automatically following the target subject appropriately as a focusing target even in the case where the size of the image of the target subject in the photographing image of the camera changes such as the case where the distance between the camera and the follow-up target subject changes or the case where the focal length of the photographing lens (optical system of the camera) changes.

To attain the object, the auto focus system according to a first aspect of the present invention comprises: a reference pattern image acquisition range setting device which sets a reference pattern image acquisition range for acquiring a reference pattern image showing an image of a target subject to be followed in a range of a photographing image to be taken by a camera; a reference pattern image storing device which acquires an image in the reference pattern image acquisition range set by the reference pattern image acquisition range setting device and stores the acquired image as the reference pattern image; a reference pattern image position detecting device which detects a position of an image matching with the reference pattern image stored by the reference pattern image storing device as against the photographing images sequentially taken by the camera; an auto focus device which changes a focusing target position based on the position detected by the reference pattern image position detecting device to have the position of the target subject followed by the focusing target position within a photographing range of the camera, and adjusts a focus of an optical system of the camera to bring the target subject into focus; a reference pattern image acquisition range position changing device which changes the position of the reference pattern image acquisition range based on the position detected by the reference pattern image position detecting device to have the position of the target subject followed by the position of the reference pattern image acquisition range set by the reference pattern image acquisition range setting device; and a reference pattern image acquisition range size changing device which changes a size of the reference pattern image acquisition range set by the reference pattern image acquisition range setting device according to the size of the image of the target subject in the photographing image of the camera.

The present invention changes the size of the reference pattern image acquisition range (reference pattern frame) for capturing and storing the reference pattern image showing the image of the target subject according to the size of the target subject to be followed as the focusing target on the photographing image. Therefore, it is possible, in the case of capturing the reference pattern image from the new photographing image and updating it, to keep the size of the image of the target subject in the reference pattern image approximately fixed. Consequently, even in the case where the target subject moves to and fro or the focal length (zoom factor) of the optical system of the camera changes and the size of the image of the target subject in the photographing image changes, it is possible to prevent problems such as an increase in the images other than the target subject in the reference pattern image and detect the image of the target subject in the photographing image appropriately so as to follow the target subject appropriately as the focusing target.

The auto focus system according to a second aspect of the present invention comprises: a reference pattern image acquisition range setting device which sets a reference pattern image acquisition range for acquiring a reference pattern image showing a target subject to be followed in a range of a photographing image to be taken by a camera; a reference pattern image storing device which acquires an image in the reference pattern image acquisition range set by the reference pattern image acquisition range setting device and storing the acquired image as the reference pattern image; a reference pattern image position detecting device which detects a position of an image matching with the reference pattern image stored by the reference pattern image storing device as against the photographing images sequentially taken by the camera; an auto focus device which changes a focusing target position based on the position detected by the reference pattern image position detecting device to have the position of the target subject followed by the focusing target position within a photographing range of the camera, and adjusts a focus of an optical system of the camera to bring the target subject into focus; and a reference pattern image size changing device which changes a relative size of the reference pattern image in the photographing image of the camera stored by the reference pattern image storing device according to the size of the image of the target subject in the photographing image of the camera.

The present invention changes the relative size of the reference pattern image showing the image of the target subject as against the photographing images according to the size of the target subject to be followed as the focusing target on the photographing image. Therefore, it is possible to keep the size of the image of the target subject in the reference pattern image and the size of the image of the target subject in the photographing image approximately fixed. Consequently, even in the case where the target subject moves to and fro or the focal length (zoom factor) of the optical system of the camera changes and the size of the image of the target subject in the photographing image changes, it is possible to detect the image of the target subject in the photographing image appropriately so as to follow the target subject appropriately as the focusing target.

In a third aspect of the present invention, the auto focus system according to the first aspect is the one wherein the change of the size of the reference pattern image acquisition range by the reference pattern image acquisition range size changing device, or the auto focus system according to the second aspect is the one wherein the change of the size of the reference pattern image by the reference pattern image size changing device is performed based on at least one of a subject distance brought into focus by the optical system of the camera and a focal length of the optical system. To be more specific, the size of the image of the target subject in the photographing image changes according to the distance to the target subject brought into focus, that is, a subject distance and the focal length (zoom factor) of the optical system. Therefore, it is possible to change the size of the reference pattern image acquisition range or the reference pattern image based on such information and thereby change the size of the reference pattern image acquisition range or the reference pattern image according to the size of the image of the target subject in the photographing image.

The auto focus system according to a fourth aspect of the present invention is the invention according to the first or third aspect, wherein the reference pattern image acquisition range size changing device changes the size of the reference pattern image acquisition range only in the case where the size of the image of the target subject in the photographing image of the camera becomes smaller than an initial size. In the case of updating the reference pattern image by changing the size of the reference pattern image acquisition range as with the first aspect, it is not so problematic when the size of the image of the target subject in the reference pattern image becomes larger because the images other than the target subject (background image and the like) as the reference pattern image do not increase. When the size of the image of the target subject in the reference pattern image becomes smaller, there is a possibility that a lot of the images other than the target subject may be included as the reference pattern image, which poses a problem. Thus, the present invention changes the size of the reference pattern image acquisition range and prevents the images other than the target subject from increasing in the reference pattern image only when the size of the image of the target subject in the reference pattern image becomes smaller, that is, when the size of the image of the target subject in the photographing image becomes smaller than the initial size.

The auto focus system according to a fifth aspect of the present invention is the invention according to the first or second aspect, wherein the auto focus device renders the focusing target as the subject in the range of an AF area set up within the photographing range of the camera and also changes the position of the AF area as the focusing target position. The present invention shows an embodiment of using the AF area as a method of specifying the subject as the focusing target.

The auto focus system according to a sixth aspect of the present invention is the invention according to the first or second aspect, wherein the reference pattern image acquisition range setting device includes a specifying device which specifies desired position and size of the reference pattern image acquisition range set first. The present invention changes the position and size of the reference pattern image acquisition range so that the operator can specify a desired target subject to be followed as the focusing target.

The auto focus system according to a seventh aspect of the present invention comprises: an image pickup device which images a subject image focused by an optical system; a reference pattern image storing device which stores as a reference pattern image an image of a target subject to be followed as a focusing target; a reference pattern image position detecting device which detects an image matching with the reference pattern image stored by the reference pattern image storing device on a screen of a photographing image acquired by the image pickup device and detects a position of the detected image on the screen; an auto focus device which adjusts a focus of the optical system to bring into focus the subject at the position detected by the reference pattern image position detecting device; a difference image generating device which extracts a difference between two photographing images acquired sequentially by the image pickup device to generate a difference image; a reference pattern image capture range setting device which sets a reference pattern image capture range for capturing the reference pattern image from the photographing images acquired by the image pickup device based on the difference image generated by the difference image generating device; a reference pattern image capturing device which captures as the reference pattern image an image in the reference pattern image capture range set by the reference pattern image capture range setting device from the photographing images acquired by the image pickup device; and a reference pattern image setting device which sets the reference pattern image captured by the reference pattern image capturing device as the reference pattern image to be stored by the reference pattern image storing device.

According to the present invention, in the case where the target subject to be followed as the focusing target is a moving object, only the image of the moving object is extracted by extracting the difference between the two photographing images acquired sequentially by the image pickup device. It is thereby possible to know the position and size of the target subject on the screen. And it is further possible to set up the capture range of the image to be stored as the reference pattern image based on the position and size thereof so as to set up an appropriate reference pattern image corresponding to the position and size of the target subject.

The auto focus system according to an eighth aspect of the present invention is the invention according to the seventh aspect, wherein the reference pattern image setting device is a device which updates the reference pattern image stored by the reference pattern image storing device with the reference pattern image captured by the reference pattern image capturing device.

The present invention shows an embodiment wherein, in the case of sequentially updating the reference pattern images, the device relating to setting of the reference pattern image of the seventh aspect is applied for the sake of the updating.

The auto focus system according to a ninth aspect of the present invention is the invention according to the seventh or eighth aspect, wherein the reference pattern image setting device sets an initial reference pattern image to be stored by the reference pattern image storing device with the reference pattern image captured by the reference pattern image capturing device.

The present invention shows an embodiment wherein the device relating to the setting of the reference pattern image of the first aspect is applied when setting up an initial reference pattern image.

The auto focus system according to a tenth aspect of the present invention is the invention according to the seventh, eighth or ninth aspect, wherein the reference pattern image capture range setting device includes a binarizing device which binarizes the difference image generated by the difference image generating device and an accumulated value calculating device which calculates a distribution of accumulated values having accumulated pixel values of the pixels horizontally and a distribution of accumulated values having accumulated the pixel values of the pixels vertically as to the pixels of the difference image binarized by the binarizing device so as to set the reference pattern image capture range based on the distributions of the accumulated values calculated by the accumulated value calculating device.

The present invention shows an embodiment wherein the reference pattern image capture range is set up based on the horizontal and vertical distributions of the accumulated values of pixel values in the difference image.

The auto focus system according to an eleventh aspect of the present invention is the invention according to the seventh, eighth, ninth or tenth aspect, wherein the auto focus device adopts an auto focus of a contrast method and adjusts the focus based on a contrast of the image in the range of a predetermined AF area out of the photographing images acquired by the image pickup device and also sets the position of the AF area at the position detected by the reference pattern image position detecting device.

The present invention shows the case where the auto focus device is of the contrast method, which is an embodiment wherein the target subject is automatically followed as the focusing target by setting the position of the AF area as an AF target range at the position of the target subject.

The auto focus system according to a twelfth aspect of the present invention comprises: an image pickup device which images a subject image focused by an optical system; an auto focus device which adjusts a focus of the optical system to bring a subject in a predetermined AF area into focus based on a contrast of an image of the subject in the AF area out of photographing images imaged by the image pickup device; a difference image generating device which extracts a difference between two photographing images acquired sequentially by the image pickup device to generate a difference image; a detecting device which detects an image range of a moving object moving on a screen as an image range of a target subject to be brought into focus based on the difference image generated by the difference image generating device; and an AF area setting device which sets a position and a size of the AF area so as to have the image of the target subject mainly included in the range of the AF area based on the image range detected by the detecting device.

According to the present invention, the position and size of the AF area are set so that the range of the AF area becomes appropriate according to the position and size of the target subject on the screen.

The auto focus system according to a thirteenth aspect of the present invention is the invention according to the twelfth aspect, wherein the detecting device includes a binarizing device which binarizes the difference image generated by the difference image generating device and an accumulated value calculating device which calculates a distribution of horizontal accumulated values having accumulated pixel values of pixels horizontally and a distribution of vertical accumulated values having accumulated the pixel values of the pixels vertically as to the pixels of the difference image binarized by the binarizing device so as to detect the image range of the target subject based on the distributions of the horizontal accumulated values and the vertical accumulated values calculated by the accumulated value calculating device. The present invention shows a concrete embodiment for the sake of detecting the image range of the target subject.

The auto focus system according to a fourteenth aspect of the present invention is the invention according to the thirteenth aspect, wherein the AF area setting device sets a rectangular AF area, sets a horizontal width of the AF area based on a distribution range of the vertical accumulated values calculated by the accumulated value calculating device and also sets a vertical width of the AF area based on a distribution range of the horizontal accumulated values calculated by the accumulated value calculating device. The present invention has the image range of the target subject detected by the detecting device corresponding to the distribution range of the horizontal accumulated values and the distribution range of the vertical accumulated values so as to set the range of the AF area by use of the distribution ranges.

The auto focus system according to the present invention is capable of automatically following the target subject appropriately as the focusing target even in the case where the size of the image of the target subject in the photographing image of the camera changes such as the case where the distance between the camera and the followed target subject changes or the case where the focal length of the photographing lens (optical system of the camera) changes.

DETAILED DESCRIPTION OF THE PREFERRED EMBODIMENTS

Hereunder, preferred embodiments of an auto focus system according to the present invention will be described in detail according to the attached drawings.

Figure 1:
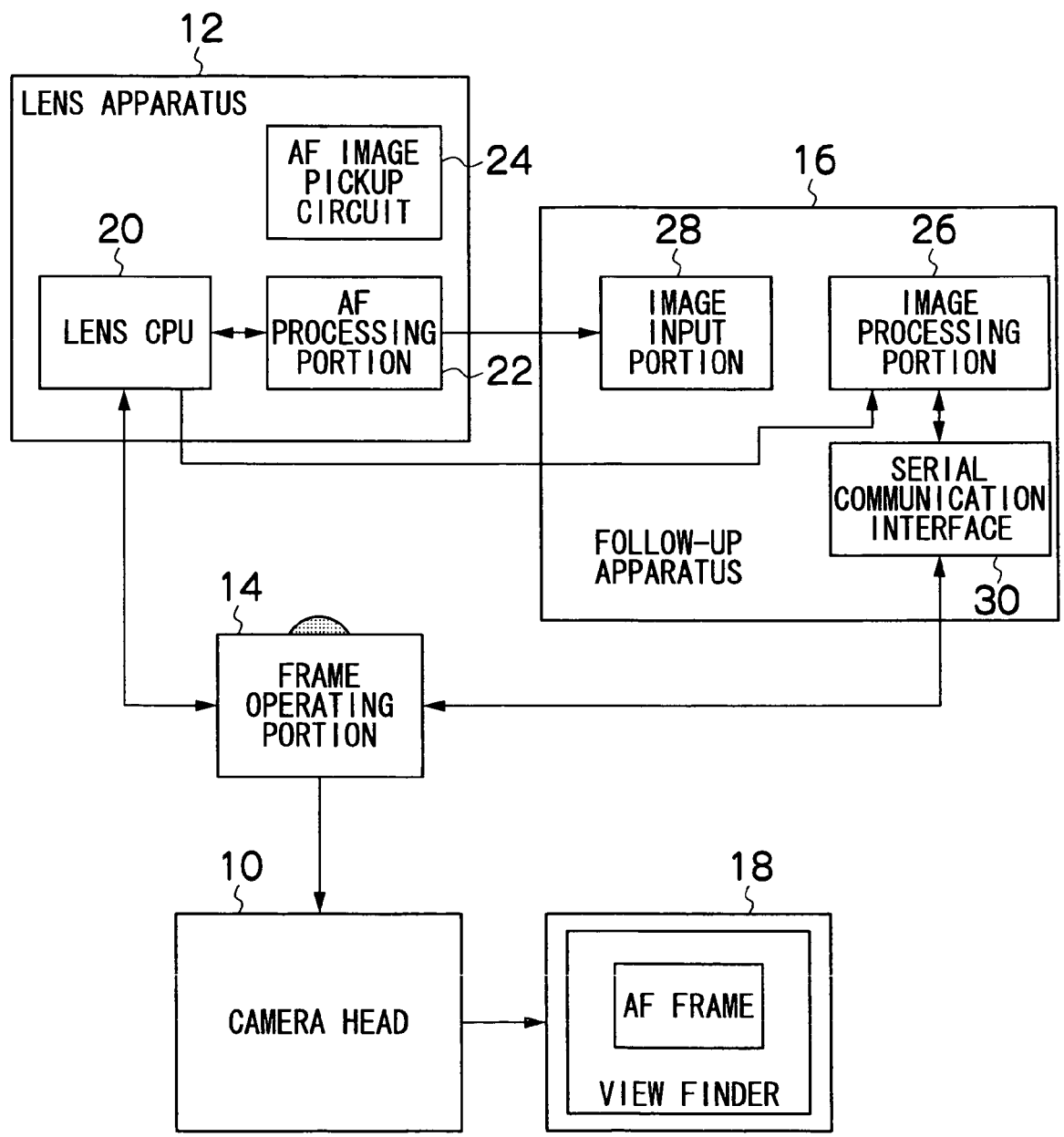
FIG. 1 is a block diagram showing an overall configuration of an image pickup system to which an auto focus system according to the present invention is applied.

FIG. 1 is a block diagram showing an overall configuration of an image pickup system to which the auto focus system according to the present invention is applied. The image pickup system shown in FIG. 1 is the one used for shooting with a broadcasting TV camera for instance. FIG. 1 shows a camera head 10 of which lens is replaceable, a lens apparatus 12 including a photographing lens (optical system) mounted on a lens mount of the camera head 10, a frame operating portion 14 and a follow-up apparatus 16 and so on.

The camera head 10 has an image pickup device (CCD for instance) and a required signal processing circuit and so on mounted thereon, where the image focused by the photographing lens of the lens apparatus 12 is photoelectrically converted by the image pickup device and has required signal processing performed thereto by the signal processing circuit thereafter. A video signal in a predetermined form generated by the signal processing circuit is outputted to external equipment from a video signal output terminal or the like of the camera head 10. The camera head 10 also has a view finder (monitor) 18 for checking a composition or the like purposes installed thereon. The video signal from the camera head 10 is provided to the view finder 18 so as to have a real-time image (video) taken by the camera head 10 displayed on the screen of the view finder 18. The view finder 18 also has information on the AF area as a target range of an auto focus (AF) such as an AF frame displayed on the screen thereof.

The lens apparatus 12 has an unshown photographing lens (optical system) mounted on the lens mount of the camera head 10. The photographing lens focuses a subject image on an image pickup surface of the image pickup device of the camera head 10. The photographing lens has movable portions such as a focus lens group, a zoom lens group and an aperture for adjusting photographing conditions provided as components thereto. These movable portions are electrically driven by an unshown motor (servo mechanism). For instance, the focus lens group and zoom lens group move in an optical axis direction, where a focus (subject distance) adjustment is made by the moving of the focus lens group and a focal length (zoom factor) adjustment is made by the moving of the zoom lens group. As for the system relating to the auto focus such as this embodiment, at least the focus lens group should be electrically drivable and the other movable portions may be only manually drivable. In the case of electrically driving a predetermined movable portion according to an operation of an operator, movement of the movable portion is controlled based on a control signal outputted from an unshown operating portion (operating portion of a controller connected to the lens apparatus 12, or the like) according to the operation of the operator. However, the details thereof will be omitted.

As shown in FIG. 1, the lens apparatus 12 has a lens CPU 20 for integrally controlling the entire lens apparatus 12, an AF processing portion 22 for performing an auto focus (AF) process, an AF image pickup circuit 24 and the like mounted thereon. The AF image pickup circuit 24 is placed on the lens apparatus 12 for the sake of acquiring the video signal for AF processing, and includes the image pickup device (CCD or the like) and a processing circuit for outputting an output signal of the image pickup device as the video signal in the predetermined form, and the like. The image pickup device of the AF image pickup circuit 24 is referred to as an AF image pickup device. The video signal outputted from the AF image pickup circuit 24 is a luminance signal.

The image pickup surface of the AF image pickup device has subject light focused thereon, which is branched from the subject light incident on the image pickup device of the camera head 10 by use of a half mirror or the like placed on a light path of the photographing lens. The photographing range and subject distance (focusable distance of the subject) to an image pickup area of the AF image pickup device are configured to match with the photographing range and subject distance to the image pickup area of the image pickup device of the camera head 10. A photographing image captured by the AF image pickup device matches with photographing image captured by the image pickup device of the camera head 10. It is not necessary for the photographing ranges thereof to be completely matching. For instance, the photographing range of the AF image pickup device may be a range large enough to include the photographing range of the image pickup device of the camera head 10. It is also feasible to provide the video signal from the camera head 10 to the AF processing portion 22 without having the AF image pickup device provided.

The AF processing portion 22 acquires the video signal from the AF image pickup circuit 24, and calculates a focus evaluation value indicating a level of a contrast of the subject image based on the video signal. For instance, high-frequency content signals of the video signal acquired from the AF image pickup device are extracted by a high-pass filter, and then the signals in the range corresponding to the AF area as the AF target range are integrated per screen out of the high-frequency content signals. An integrated value thus acquired per screen indicates the level of the contrast of the subject image, and is given to the lens CPU 20 as the focus evaluation value. The range of the AF area is specified by the lens CPU 20 as will be described later.

As will be described in detail later, the lens CPU 20 acquires information on the AF frame indicating the range (outline) of the AF area (AF frame information) from the frame operating portion 14, and specifies the range in the AF frame specified by the AF frame information as the AF area to the AF processing portion 22. The lens CPU 20 then acquires from the AF processing portion 22 the focus evaluation value acquired from the image (video signal) in the AF area, and controls the focus lens group so as to maximize the acquired focus evaluation value, that is, the contrast of the subject image in the AF area. For instance, a climbing method is generally known as the method of controlling the focus lens group based on the focus evaluation value, whereby the focus lens group is moved in a direction for increasing the focus evaluation value and is set at a detected point, if any, at which the focus evaluation value starts to decrease. Thus, it is possible to automatically bring the subject in the AF frame into focus.

Figure 2:
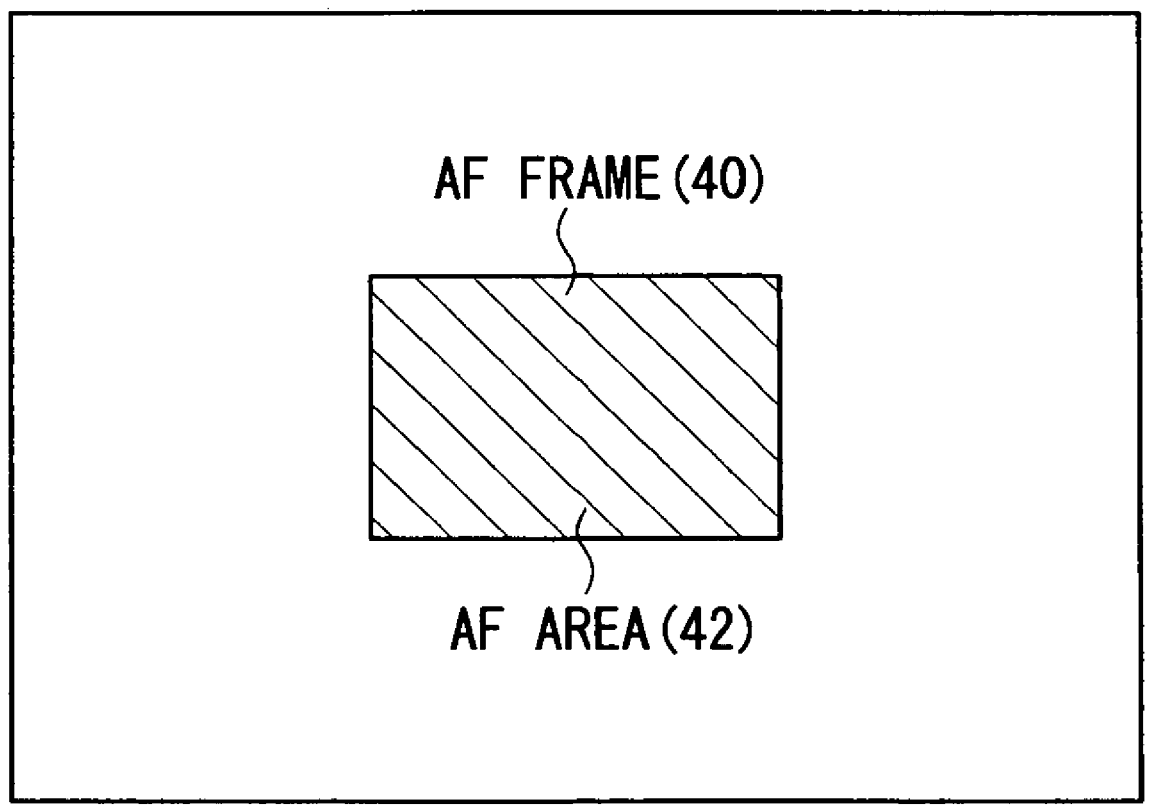
FIG. 2 is a diagram showing an AF frame.

The frame operating portion 14 includes an operating member for the operator to specify set contents of the AF frame, such as the position, size and form thereof. As shown in FIG. 2, an AF frame 40 shows the outline of an AF area 42 as the AF target range against the photographing range or (screen of) photographing image of the image pickup device of the camera head 10. If the operating member is manipulated by the operator, the frame operating portion 14 sets and changes the set contents such as the position of the AF frame according to the operation. According to this embodiment, the form of the AF frame is limited to a rectangle of which aspect ratio is fixed. As for a change in the set contents such as the position and size of the AF frame made by the operating member of the frame operating portion 14, it is made, in reference to the set contents of the AF frame before the operation, by changing the set contents by an amount of the change corresponding to the amount of the operation of the operating member thereafter. For instance, as regards the position of the AF frame, the AF frame is displaced vertically and horizontally in the direction and by the amount corresponding to a rotation direction and a rotation amount of a trackball. If the point for deciding the position of the AF frame (center location of the rectangular AF frame in this embodiment) in the photographing range (screen of the photographing image) is referred to as an AF point, the position of the AF frame is decided by setting the position of the AF point.

In a state in which the operating member of the frame operating portion 14 is not manipulated and no instruction for the change in the set contents of the AF frame is provided by the operator, the set contents of the AF frame are set and changed according to the AF frame information provided by the follow-up apparatus 16. The frame operating portion 14 transmits to the lens CPU 20 the AF frame information indicating the set contents of the AF frame set and changed according to the operation of the operator or the AF frame information from the follow-up apparatus 16 according to a request from the lens CPU 20. Thus, the AF target range is set to the range of the AF frame set and changed by the frame operating portion 14.

The follow-up apparatus 16 is an apparatus for, while detecting the target (target subject) specified by the operator on the screen, automatically changing (automatically following) the position of the AF area (AF frame) to fit the movement of the target. In the case where no operation for changing the AF frame is performed by the operator, the follow-up apparatus 16 automatically follows the AF frame. In the case where the operation (manual operation) for changing the AF frame is performed by the operator, the operation takes precedence over the follow-up apparatus 16 and the AF frame is changed according to the operation of the operator. It is also possible to turn off the automatic follow-up function and render only the manual operation effective.

The frame operating portion 14 also transmits to the camera head 10 the AF frame information indicating the set contents of the AF frame set and changed as described above, and causes the AF frame to be displayed at a corresponding position on the screen of the view finder 18. Thus, the operator can recognize the position, size, form and so on of the AF frame at the time while watching the view finder 18.

The follow-up apparatus 16 includes an image processing portion 26, an image input portion 28, a serial communication interface 30 and so on. The image input portion 28 obtains the video signal (luminance signal) acquired by the AF image pickup circuit 24 via the AF processing portion 22, and provides the image processing portion 26 with image data on the photographing image acquired from the video signal according to the request from the image processing portion 26.

The image processing portion 26 acquires the range of the AF frame for following the target as a focusing target based on the image data acquired from the image input portion 28, and transmits the AF frame information indicating the range of the AF frame to the frame operating portion 14 via the serial communication interface 30. For instance, the image processing portion 26 detects the image of the target specified by the operator by a pattern matching (normalized correlation) process or the like based on the image data acquired from the image input portion 28, and acquires the position of the AF frame (AF point) for the sake of having the movement of the target followed by the AF frame. And the image processing portion 26 transmits the AF frame information indicating the position of the AF frame to the frame operating portion 14 via the serial communication interface 30 so as to specify the position of the AF frame on automatically following the AF frame.

Here, according to this embodiment, the image of the follow-up target as the focusing target is set by having the range to be captured as the image of the follow-up target specified by the operator out of the photographing images acquired via the image input portion 28 and capturing and storing the image in that range as the reference pattern image. According to this embodiment, the AF frame used for the AF is also used as the reference pattern frame for specifying a capture range of an initial reference pattern image (target image). Therefore, when specifying the image of the follow-up target, the operator changes the position and size of the AF frame with the frame operating portion 14 while watching the video and AF frame displayed on the view finder 18 so as to put all or a part of a desired target in the range of the AF frame. On pushing a predetermined decision button (storage instruction button) of the frame operating portion 14, the image in the AF frame at that time is stored as the reference pattern image.

It is not necessary for the AF frame for the AF (indicating the target range of the AF) to match with the reference pattern frame for specifying the capture range of the initial reference pattern image. It is also possible, even in the case of using the AF frame also as the reference pattern frame as with this embodiment, to capture the reference pattern image in a range of a different size from the AF frame (provided that the center location is matching) as the range of the reference pattern frame and store it. When specifying the capture range of the initial reference pattern image, it is also possible to have the reference pattern frame actually displayed on the view finder 18 apart from the AF frame so as to allow the capture range of the reference pattern image to be specified by changing the position, size and so on of the reference pattern frame.

The image processing portion 26 captures the reference pattern image from a new photographing image and updates it as will be described later. The size of the reference pattern frame as the capture range of the reference pattern image in that case is changed based on the distance of the follow-up target and the focal length (zoom factor) of the photographing lens and according to the size of the image of the target in the photographing image of the camera.

Here, the follow-up target is brought into focus by the AF, and so the distance between the camera and the follow-up target is the distance to the target in focus (subject distance). The subject distance is obtainable from the position of the focus lens group in the photographing lens. The focal length of the photographing lens is obtainable from the position of the zoom lens group. Potentiometers are coupled to the focus lens group and the zoom lens group, and position signals outputted from the potentiometers are provided to the lens CPU 20 of the lens apparatus 12. Thus, the lens CPU 20 acquires subject distance information indicating the subject distance based on the position signal of the focus lens group and acquires focal length information indicating the focal length based on the position signal of the zoom lens group so as to provide the subject distance information and focal length information to the image processing portion 26 of the follow-up apparatus 16.

Figure 3:
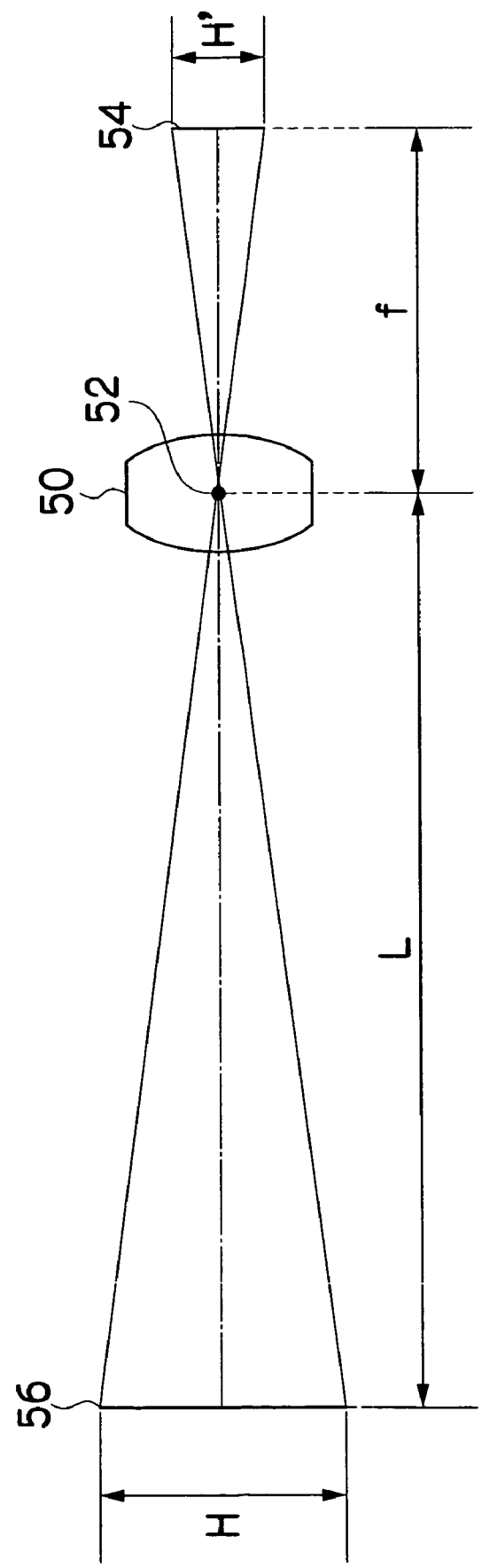
FIG. 3 is a schematic diagram used for a description of a change in size of a reference pattern frame.

The image processing portion 26 changes the size of the reference pattern frame as follows based on the subject distance information and focal length information acquired from the lens CPU 20. FIG. 3 is a diagram showing the distance from a predetermined reference position (principal point position) 52 of a photographing lens 50 simply shown to an imaging surface (image pickup surface of the image pickup device of the camera head 10) 54 of the photographing lens 50 as a focal length f and the distance from that to a substance surface 56 in focus as a subject distance L. In FIG. 3, if a diagonal length of the reference pattern frame is H' when expressed as the length on the imaging surface 54 (photographing image), a diagonal length H of the reference pattern frame on the substance surface 56 corresponding to the length H' is represented by the following formula (1).

$$H = H^* (L/f) \tag{1}$$

In the case where the subject distance L changes as the position of the follow-up target changes or in the case where focal length f changes due to a zoom operation of the photographing lens 50, the image processing portion 26 changes the diagonal length H' of the reference pattern frame on the imaging surface 54 (photographing image) so that the diagonal length H of the reference pattern frame on the substance surface 56 becomes fixed against the length on initially storing the reference pattern image, that is, the length on setting the initial reference pattern frame. For that reason, the diagonal length H of the reference pattern frame on the substance surface 56 should be acquired first by the above formula (1) based on the diagonal length H' on the photographing image on setting the initial reference pattern frame and the subject distance L and focal length f at that time.

And in the case where the subject distance L and focal length f change, the diagonal length H' of the reference pattern frame on the photographing image on updating the reference pattern image is calculated by the following formula (2) based on the subject distance L and focal length f and the length H at that time so as to change the size of the reference pattern frame to become the calculated diagonal length H'.

$$H' = H^* (f/L) \tag{2}$$

And the image in the updated reference pattern frame is captured as a new reference pattern image from within the photographing image and is stored.

The change in the size of the reference pattern frame represents the change wherein the aspect ratio of the rectangular (square) reference pattern frame is fixed, area is expanded or reduced and the reference pattern frame is expanded (or reduced) vertically and expanded (or reduced) horizontally at the same magnification. The reference pattern frame does not have to be rectangular, in which case the change in the size of the reference pattern frame represents the change of expanding (or reducing) it vertically and expanding (or reducing) it horizontally at the same magnification.

Thus, the diagonal length H' of the reference pattern frame on the photographing image is changed to render the diagonal length H of the reference pattern frame on the substance surface 56 fixed. It is thereby possible to automatically change the size of the reference pattern frame according to the size of the image of the target on the photographing image.

Therefore, the size of the image of the target in the reference pattern image to be updated is kept approximately fixed so as to prevent the problems caused by including a lot of the images other than the target (background image and the like) in the reference pattern image.

Next, a detailed description will be given by referring to a flowchart of FIG. 4 as to the follow-up process by the image processing portion 26 in the follow-up apparatus 16. First, as the operation for setting the reference pattern image, the operator manipulates the operating member of the frame operating portion 14 while watching the video and AF frame displayed on the view finder 18 so as to put all or a part of the follow-up target as the focusing target into the AF frame. The operator manipulates the AF frame in this case as the reference pattern frame indicating the range for capturing the reference pattern image rather than manipulating it merely as the frame for setting the AF target range (AF area). Therefore, the operator sets the AF frame at the position and size appropriate as the capture range of the image to be stored as the reference pattern image.

It is possible, by performing such an operation, to bring the target into focus by the AF process with the lens CPU 20. Subsequently, the operator pushes the decision button of the frame operating portion 14. Thus, the instruction for setting the reference pattern image (reference pattern image storage instruction) is provided to the image processing portion 26 from the frame operating portion 14.

If the instruction for setting the reference pattern image is provided, the image processing portion 26 reads the AF frame information indicating the set contents of the AF at that time as the reference pattern frame information from the frame operating portion 14 via the serial communication interface 30, and also captures the photographing image (image data) equivalent to one screen from the video signal provided from the AF processing portion 22 of the lens apparatus 12 to the image input portion 28 (step S10). The photographing image captured in this case is referred to as an image A. If the video signal provided from the AF processing portion 22 to the image input portion 28 is an interlace video signal configuring one screen (screen equivalent to one frame) with a screen equivalent to two fields for instance, the photographing image (image data) captured as one screen from the image input portion 28 may be either the photographing image (image data) obtainable by the video signal equivalent to one field or that obtainable by the video signal equivalent to two fields.

Subsequently, the image processing portion 26 captures the image in the AF frame (reference pattern frame) specified by the AF frame information (reference pattern information) out of the image A, and sets (stores) it as the reference pattern image (step S12).

Here, according to this embodiment, the AF frame is also used as the reference pattern frame on setting the initial reference pattern image, and so the AF frame matches with the reference pattern frame completely as to the position (center location), size and so on. However, the AF frame may be different from the reference pattern frame except that its center location matches therewith. According to this embodiment, it is possible, on setting the initial reference pattern image, to set the size of the AF frame to an appropriate size as the reference pattern frame and change the size of the AF frame to an appropriate size as the AF target range after setting the reference pattern image for instance so as to render the size of the AF frame and the reference pattern frame intentionally changeable by the operator. It is also possible, as opposed to this, to display the reference pattern frame on the view finder 18 separately from the AF frame on setting the initial reference pattern image so as to render the position, size and so on of the reference pattern frame changeable by the operator separately from the AF frame.

In the step S12, the image processing portion 26 obtains the subject distance information and the focal length information based on the positions of the focus lens group and the zoom lens group from the lens CPU 20 of the lens apparatus 12. And the image processing portion 26 calculates the diagonal length H of the reference pattern frame on the substance surface 56 by the formula (1) based on the subject distance L and focal length f based on such information and the diagonal length H' of the reference pattern frame on setting the initial reference pattern image (the diagonal length H' on the imaging surface 54 (photographing image) of FIG. 3) as described above, and stores it. To be more specific, H is calculated by the following formula (1) and is stored.

$$H=H'*(L/f) \tag{1}$$

On completing the setting of the initial reference pattern image as described above, the image processing portion 26 subsequently performs the processes of the following steps S14 to S26 repeatedly. First, the image processing portion 26 newly captures the photographing image (image data) equivalent to one screen from the image input portion 28 (step S14). The image acquired in the step S14 is referred to as an image B. And the image processing portion 26 detects the position of the image matching with the reference pattern image by a known pattern matching process in a predetermined pattern detection range set up in a screen range of the image B (step S16). Here, the pattern detection range may be either the entire range of the photographing image (image B) or a range a little larger than the currently set reference pattern frame for the sake of reducing the time or processing burden required for the pattern matching process. Even in the case of setting the initial reference pattern frame by use of the AF frame as with this embodiment, the reference pattern frame and the AF frame are handled as separate frames once the reference pattern frame is set. However, their center locations are changed to be constantly matching.

Next, the image processing portion 26 determines whether or not the position of the image of the target has moved from the position detected last time based on the position of the reference pattern image detected in the step S16, that is, the position of the image of the follow-up target in the photographing image (image B) (step S18). If determined as YES, the image processing portion 26 displaces the position of the AF frame by the same distance and in the same direction as the movement of the image of the target, and transmits the AF frame information indicating the position of the AF frame to the frame operating portion 14. It thereby updates the set contents of the AF frame, that is, the position of the AF frame so as to move the AF frame to the position of the image of the target. The image processing portion 26 also displaces the position of the reference pattern frame as with the position of the AF frame to match the center location of the reference pattern frame with that of the AF frame (step S20). If determined as NO in the step S18, the process of the step S20 is not performed and the positions of the AF frame and the reference pattern frame are not changed.

Next, the image processing portion 26 obtains the subject distance information and the focal length information from the lens CPU 20 of the lens apparatus 12, and determines whether or not one of the subject distance information and the focal length information has changed from a previous determination (step S22). If determined as YES, the image processing portion 26 calculates the diagonal length H' of the reference pattern frame on the photographing image (imaging surface 54) by the formula (2) based on the diagonal length H (refer to FIG. 3) of the reference pattern frame on the substance surface 56 calculated and stored in the step S12 and the subject distance L and focal length f based on the subject distance information and the focal length information obtained in the step S22. To be more specific, H' is calculated by the following formula (2).

$$H'=H*(f/L) \tag{2}$$

And the size of the reference pattern frame is changed so that the diagonal length of the reference pattern frame on the imaging surface becomes H' (step S24). If determined as NO in the step S22, the process of the step S24 is not performed and the size of the reference pattern frame is not changed.

Next, the image processing portion 26 captures the image in the currently set reference pattern frame from the image B, and updates (stores) the image in the reference pattern frame as a new reference pattern image (step S26). On finishing the process of the step S26, it returns to the step S14.

According to the above follow-up process, the images of the target are captured from the new photographing images and consecutively updated as the reference pattern images. Therefore, in the case where the pattern of the image of the target changes, such as the case where the target is a person's face and the person changes the direction of the face, it is possible to detect the image of the target appropriately by the pattern matching process so as to have the target followed accurately by the AF frame. When updating the reference pattern image, the size of the reference pattern frame for capturing the image is changed according to the size of the image of the target in the photographing image. Thus, the size of the image of the target in the reference pattern image is kept at the size of the image of the target in the initial reference pattern image. Therefore, even in the case where the target moves to and fro and the subject distance changes or the focal length of the photographing lens changes resulting in the change in the size of the image of the target on the photographing image for instance, the size of the image of the target in the reference pattern image is kept approximately fixed so as to prevent the problem such as an increase in the images other than the target (background image and the like) included in the reference pattern image.

In the case where the size of the image of the target in the photographing image becomes larger than the size on setting the initial reference pattern image, there is hardly a problem if the reference pattern image is captured and updated in the size of the initial reference pattern frame. To be more specific, in the case where the size of the image of the target in the reference pattern image becomes larger, there is no problem of the increase in the images other than the target in the reference pattern image. Thus, it is possible to render the size of the reference pattern frame as the size of the initial reference pattern frame in the case where the size of the image of the target in the photographing image becomes larger than the size on setting the initial reference pattern image, and change the size of the reference pattern frame only in the case where the size of the image of the target in the photographing image becomes smaller than the size on setting the initial reference pattern image.

The method for acquiring the size of the reference pattern frame on updating the reference pattern image is not limited to the embodiment. For instance, if the diagonal length of the initial reference pattern frame on setting the initial reference pattern image is H'0, the subject distance in that case is L0, the focal length is f0, and the subject distance on updating the reference pattern image is L and the focal length is f, the diagonal length H' of the reference pattern frame on updating the reference pattern image is represented as follows by the formula (1).

$$H'=H'0*(L0/f0)*(f/L)$$

Therefore, it may be acquired as the reference pattern frame on updating the reference pattern image having the size of the initial reference pattern frame multiplied by (L0/f0 ) *(f/L).

Next, a description will be given as to another embodiment about the follow-up process by the image processing portion 26 in the follow-up apparatus 16. As for the follow-up process of the above embodiment, a description was given as to the case of capturing and updating the reference pattern image from the new photographing image. In the case where the pattern of the image of the follow-up target does not change, it is not always necessary to update the pattern of the reference pattern image. In the case where the follow-up target moves to and fro or the focal length of the photographing lens changes and then the size of the image of the target on the photographing image changes, the size of the image of the target on the reference pattern image is different from the size of the image of the target on the photographing image so that it becomes difficult to detect the image of the target by the pattern matching process.

Thus, this embodiment describes the follow-up process wherein, in the case of not capturing and updating the reference pattern image from the new photographing image, the size of the initially stored reference pattern image is changed according to the size of the image of the target on the photographing image so as to detect the image of the target appropriately by the pattern matching process even in the case where the follow-up target moves to and fro or the focal length of the photographing lens changes.

First, on setting (storing) the initial reference pattern image, the diagonal length H of the reference pattern frame on the substance surface 56 is calculated by the above-mentioned formula (1) against the subject distance L, the focal length f and the diagonal length H' of the reference pattern frame on the photographing image (imaging surface 54 of FIG. 3) at that time, and is stored.

$$H=H'*(L/f) \tag{1}$$

In the case where the subject distance L or the focal length f changes, the diagonal length H' of the reference pattern frame on the photographing image is calculated by the above-mentioned formula (2) so as to render the diagonal length H of the reference pattern frame on the substance surface 56 fixed.

$$H'=H*(f/L) \tag{2}$$

And the size of the stored reference pattern image (the numbers of vertical and horizontal pixels) is changed to match with the size of the reference pattern frame of the diagonal length H'. For instance, the pixels of the reference pattern image are interpolated to enlarge the image size in the case of enlarging the reference pattern image, and the pixels of the reference pattern image are thinned out to reduce the image size in the case of rendering the reference pattern image smaller. The pattern matching process is performed by using the reference pattern image of which size is changed so as to detect the image of the target.

Thus, even in the case where the target moves to and fro or the focal length of the photographing lens changes, the size of the image of the target in the reference pattern image and the size of the image of the target in the photographing image are kept approximately fixed. Therefore, it is possible to detect the image of the target appropriately by the pattern matching process.

Figure 4:
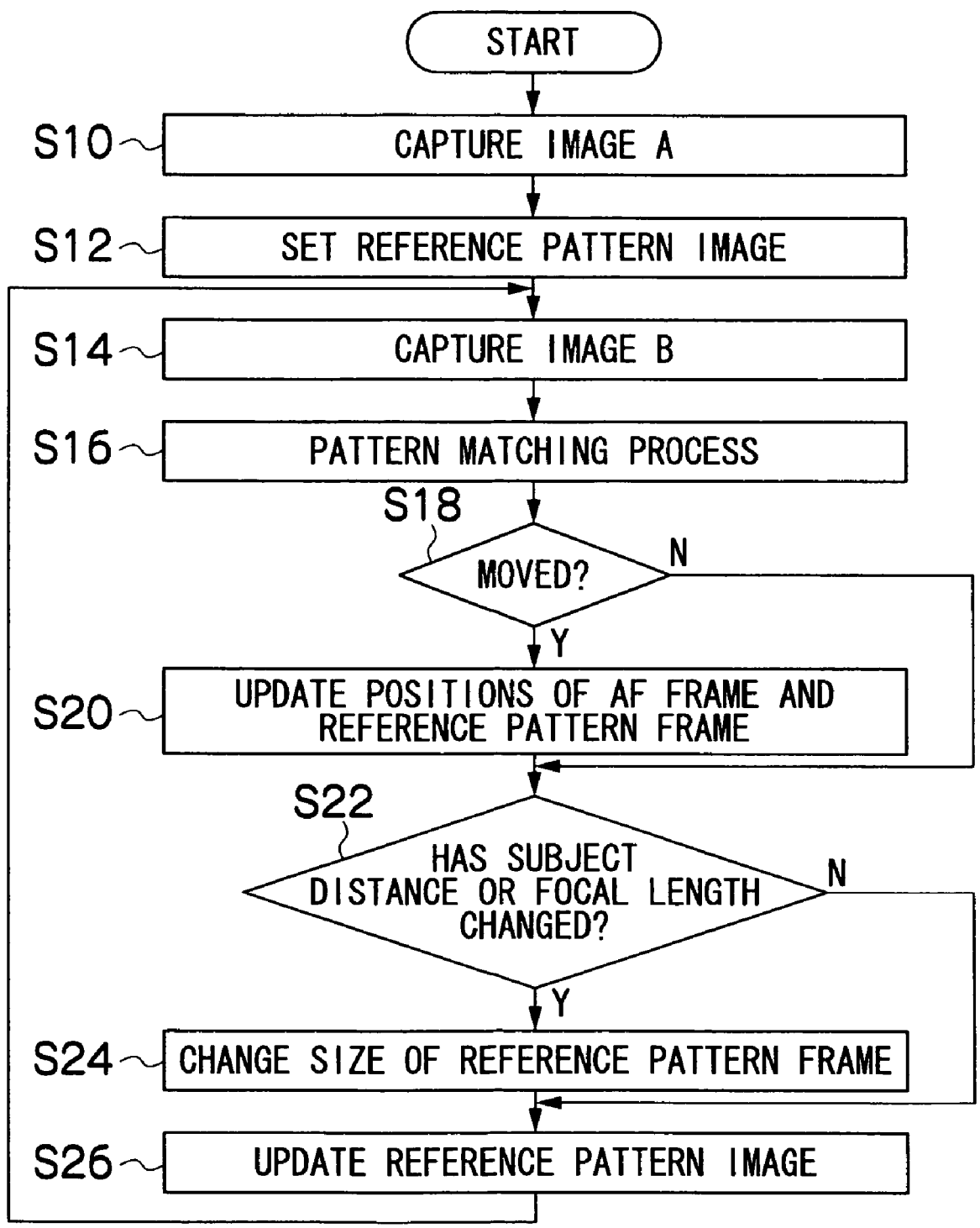
FIG. 4 is a flowchart showing a procedure of a follow-up process of a follow-up apparatus.
Figure 5:
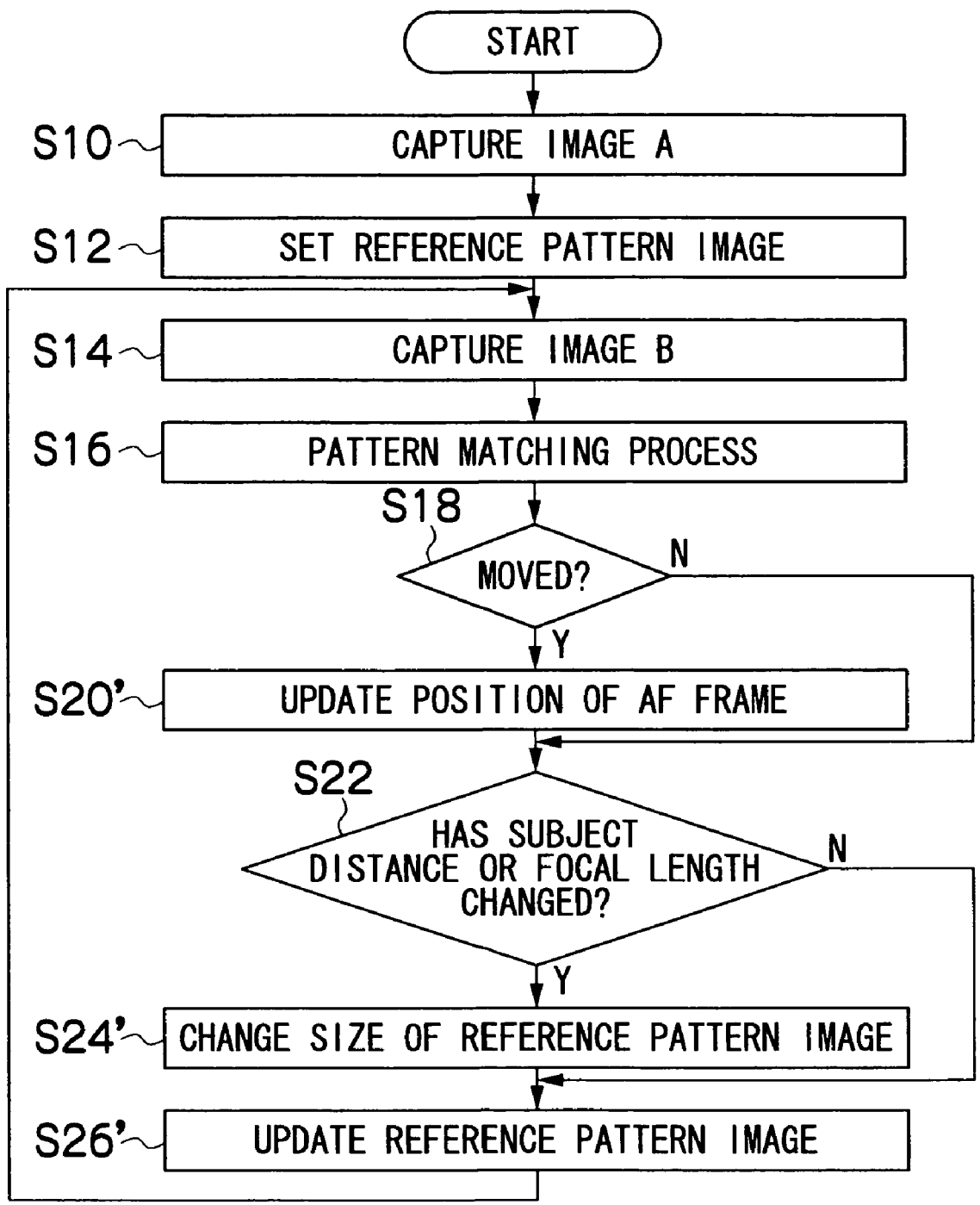
FIG. 5 is a flowchart showing the procedure of the follow-up process of the follow-up apparatus according to another embodiment.

FIG. 5 is a flowchart showing a procedure of the follow-up process in the image processing portion 26 according to this embodiment. In the flowchart of FIG. 5, the same reference numerals as FIG. 4 are given to the same processing blocks as those in FIG. 4.

The processes performed in the steps S10 to S18 in FIG. 5 are the same as the processes performed in the steps of the same reference numerals S10 to S18 in FIG. 4, and so a description thereof will be omitted. If determined as YES, that is, the position of the follow-up target moved in the step S18, the image processing portion 26 displaces the position of the AF frame by the same distance and in the same direction as the movement of the image of the target, and transmits the AF frame information indicating the position of the AF frame to the frame operating portion 14. It thereby updates the position of the AF frame so as to move the AF frame to the position of the image of the target (step S20'). If determined as NO in the step S18, the process of the step S20' is not performed and the position of the AF frame is not changed.

Next, the image processing portion 26 obtains the subject distance information and the focal length information from the lens CPU 20 of the lens apparatus 12, and determines whether or not at least one of the subject distance information and the focal length information has changed from the previous determination based on the information (step S22). If determined as YES, the image processing portion 26 calculates the diagonal length H' of the reference pattern frame on the photographing image (imaging surface 54) by the formula (2) based on the diagonal length H of the reference pattern frame on the substance surface 56 calculated and stored in the step S12 and the subject distance L and focal length f based on the subject distance information and the focal length information obtained in the step S22. To be more specific, H' is calculated by the following formula (2).

$$H' = H*(f/L) \qquad (2)$$

And the image processing portion 26 changes the size of the reference pattern image set up in the step S12 to match with the size of the reference pattern frame of which diagonal length on the imaging surface is H' (step S24'). To be more specific, the size of the reference pattern image is changed by interpolating or thinning out the pixels of the reference pattern image set up in the step S12.

Next, the image processing portion 26 updates (stores) the reference pattern image of which size has been changed in the step S24' as a new reference pattern image (step S26'). The reference pattern image initially stored in the step S12 is retained for the sake of reusing it in the step S24'.

On finishing the process of the step S26', it returns to the process of the step S14. If determined as YES in the step S20, it returns to the step S14 without performing the processes of the steps S24' and S26'.

In the processing, the size of the reference pattern image is changed so that the size of the image of the target in the reference pattern image matches with the size of the image of the target in the photographing image. It is also feasible, however, to change the size of the reference pattern image relatively against the photographing image. For instance, it is also possible to change the size of the photographing image (image B) on performing the pattern matching process instead of changing the size of the reference pattern image.

As described above, it is not necessary, in the above embodiment, to have a frame (field) frequency of the video signal obtained by the AF image pickup circuit 24 (AF image pickup device) of the lens apparatus 12 matching with the frame frequency of the video signal obtained by the image pickup device of the camera head 10. The frame frequency of the video signal in the AF image pickup circuit 24 is rendered higher so as to improve adaptability to the target moving at high speed or the target of which image changes rapidly.

The embodiment shows the lens apparatus 12, frame operating portion 14 and follow-up apparatus 16 as separate apparatuses. However, any two or the entirety of them may be an integrated apparatus. The embodiment provides the operating members (a decision switch for deciding the target, for instance) relating to the processing of the follow-up apparatus 16 to the frame operating portion 14. It is also possible, however, to provide them to the follow-up apparatus 16.

According to the embodiment, the video signal is obtained for the AF by an AF-specific image pickup device separate from the image pickup device of the camera head 10. It is also possible, however, to use for the AF the video signal obtained by the image pickup device of the camera head 10. If the video signal for the AF is obtained from the AF-specific image pickup device as with the embodiment, it is possible, in the case where the camera head 10 supports a high-definition (HD) television system, to perform the AF without using an HD signal thereof, which is advantageous as to miniaturization and power saving.

Next, a description will be given by referring to the flowchart of FIG. 6 as to another embodiment about the follow-up process by the image processing portion 26 in the follow-up apparatus 16. First, the operator manipulates the operating member of the frame operating portion 14 while watching the video and AF frame displayed on the screen of the view finder 18 so as to put all or a part of the follow-up target as the focusing target in the AF frame. Thus, the target is brought into focus by the AF process of the lens CPU 20.

Subsequently, the operator pushes the decision button of the frame operating portion 14. Thus, the frame operating portion 14 provides an instruction for setting the reference pattern image (instruction for storing the reference pattern image) to the image processing portion 26.

If the instruction for setting the reference pattern image is provided, the image processing portion 26 reads the AF frame information indicating the set contents of the AF at that time from the frame operating portion 14 via the serial communication interface 30, and also captures the photographing image (image data) equivalent to one screen (one frame) from the video signal provided from the AF processing portion 22 of the lens apparatus 12 to the image input portion 28 (step S110). The photographing image captured in this case is referred to as an image A. If the video signal provided from the AF processing portion 22 to the image input portion 28 is an interlace video signal configuring the photographing image equivalent to one screen (equivalent to one frame) with the video signal equivalent to two fields for instance, the photographing image captured as one screen from the image input portion 28 may be either the photographing image obtainable by the video signal equivalent to one field or that obtainable by the video signal equivalent to two fields. In the case of a non-interlace method, the photographing image is obtainable by the video signal equivalent to one frame.

Of the image A captured in the step S110, the image processing portion 26 subsequently sets the range of the AF frame specified by the AF frame information as the range of the reference pattern frame, and extracts the image in that range from the image A to set (store) it as the reference pattern image (step S112).

Here, the reference pattern image is the image data to be used in the pattern matching process described later. In this embodiment, the range of the reference pattern frame for capturing the initial reference pattern image matches with the range of the AF frame. However, the size of the range of the initial reference pattern frame may be different (a little larger for instance) from that of the AF frame. It is also possible to display the reference pattern frame on the view finder 18 separately from the AF frame and render the range of the reference pattern frame settable by the operation separate from the AF frame.

On completing the setting of the reference pattern image in the step S112, the image processing portion 26 subsequently performs the processes of the following steps S114 to S132 repeatedly. First, the image processing portion 26 newly captures the photographing image equivalent to one screen from the image input portion 28 (step S114). The image acquired in the step S114 is referred to as an image B.

Next, the image processing portion 26 detects the range (position) of the image matching with the reference pattern image in the range of the image B by performing the known pattern matching process (step S116).

Subsequently, the image processing portion 26 determines whether or not the target has moved on the screen based on the position detected by the pattern matching process (step S118). If determined as YES, the image processing portion 26 displaces the position of the AF area (AF point) by the same distance and in the same direction as the movement of the target, and transmits the AF frame information indicating the position of the AF area to the frame operating portion 14. It thereby updates the set contents of the AF frame, that is, the position of the AF frame (step S120). If the position of the AF frame is updated, the AF target range of the lens apparatus 12 is updated accordingly and the position of the AF frame displayed on the screen of the view finder 18 is also updated. If determined as NO in the step S118, the process of the step S120 is not performed.

Figure 7:
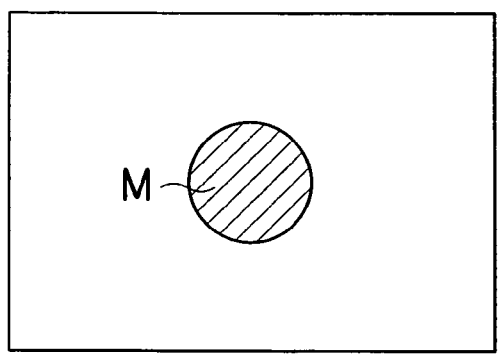
FIG. 7 is a schematic diagram used for a description of a difference image.
Figure 7:
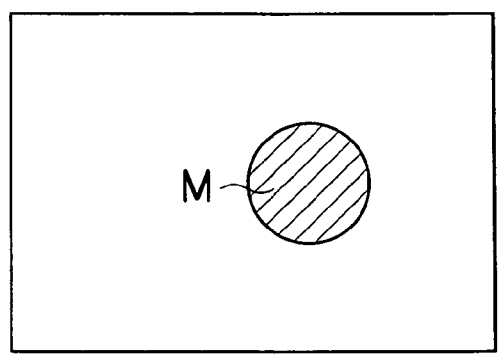
Figure 7:
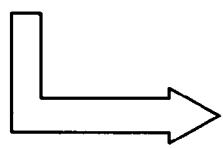
Figure 7:
Figure 7:
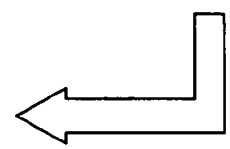
Figure 7:
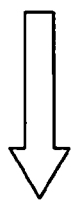
Figure 7:
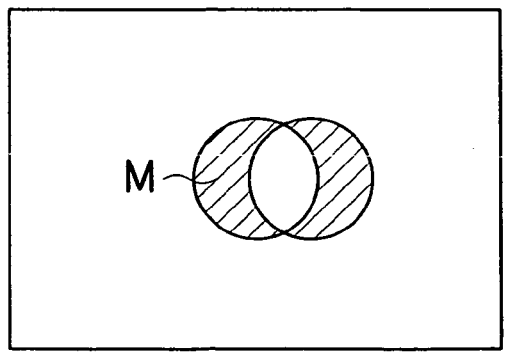

Next, the image processing portion 26 generates a difference image C extracted by a difference between the image A and the image B (step S122). To be more specific, it acquires the difference in pixel value (luminance value) between mutually corresponding pixels of the image A and the image B, and generates the difference image C having an absolute value of the difference as the pixel value of each individual pixel (C=|A−B|). For instance, the images shown in FIGS. 7A and 7B are obtained as the image A and the image B respectively. In FIGS. 7A and 7B, a moving object M moving on the screen is shown simply as circular image at a fixed luminance, and background drawings not changing on the screen are omitted. As against the images A and B, the difference image C is generated as the image in FIG. 7. As shown in FIG. 7, the difference image C has a changeless background image eliminated and has only the image of the portion in which the image of the moving object M is not overlapping between the image A and the image B extracted.

Next, as for the pixel value of each individual pixel of the difference image C generated in the step S122, the image processing portion 26 sets it to 1 if equal to or over a predetermined threshold and to 0 if less than the threshold so as to binarize the difference image C (step S124).

Next, the image processing portion 26 newly captures the photographing image equivalent to one screen from the image input portion 28, and renders the image as a new image A so as to update the image A (step S126). This image A is used for generation of the difference image C (step S122) in a repeated process subsequent to the repeated processes of the steps S114 to S132. Subsequently, the image processing portion 26 performs a process of a binary accumulated projection to the binarized difference image C (step S128).

Figure 8:
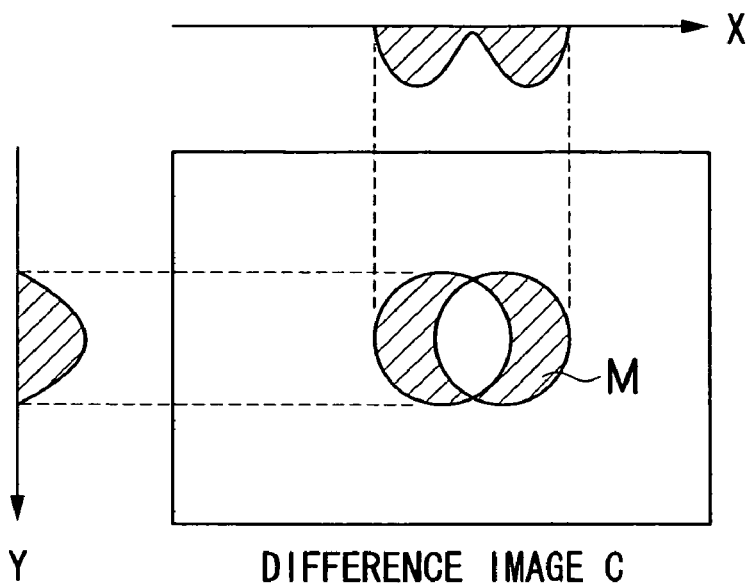
FIG. 8 is a schematic diagram used for a description of a process of binary accumulated projection.

Here, the process of the binary accumulated projection will be described. The binary accumulated projection acquires horizontal accumulated values having accumulated (integrated) the pixel values of the pixels arranged on the same horizontal (lateral) line as against the binarized pixels of the difference image C and vertical accumulated values having accumulated the pixel values of the pixels arranged on the same vertical (lengthwise) line, and projects the horizontal accumulated value and vertical accumulated value of each individual line on a Y-axis (longitudinal axis) and an X-axis (abscissa axis) assumed on the screen respectively. It thus creates binary accumulated projection distributions for showing the distributions of the horizontal accumulated values and vertical accumulated values on the Y-axis and the X-axis respectively. For instance, if the process of the binary accumulated projection is performed to the difference image C generated as in FIG. 7, a result shown in FIG. 8 is obtained. In FIG. 8, each individual coordinate point (x-coordinate value) of the X-axis has the vertical accumulated value having accumulated the pixel values of the pixels of the same x-coordinate value (pixels arranged on the same vertical line) projected thereon, and each individual coordinate point (y-coordinate value) of the Y-axis has the horizontal accumulated value having accumulated the pixel values of the pixels of the same y-coordinate value (pixels on the horizontal line) projected thereon.

Figure 9:
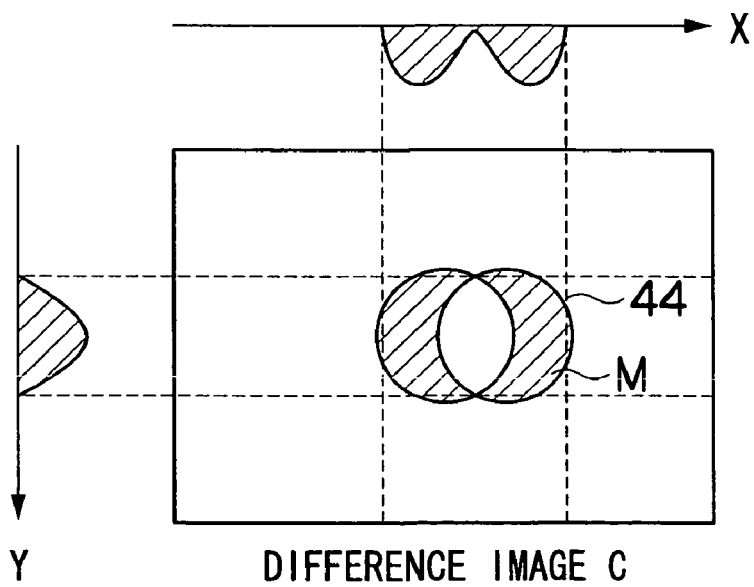
FIG. 9 is a schematic diagram used for a description of setting (updating) of the reference pattern frame.

Next, the image processing portion 26 updates the reference pattern frame based on the results of the binary accumulated projection to the X-axis and Y-axis in the step S128 (step S130). For instance, it sets a rectangular reference pattern frame by setting horizontal width of the reference pattern frame to the range of values of 1 to 99 percent to the total (area) of the vertical accumulated values projected on the X-axis (the range excluding the range of the value equivalent to 1 percent of the area from the left end and right end of the screen respectively) and setting vertical width of the reference pattern frame to the range of values of 1 to 99 percent to the total (area) of the horizontal accumulated values projected on the Y-axis (the range excluding the range of the value equivalent to 1 percent of the area from the upper end and lower end of the screen respectively). For instance, if the distribution of the binary accumulated projection shown in FIG. 8 is acquired, a reference pattern frame 44 as shown in FIG. 9 is set.

After thus setting (updating) the reference pattern frame, the image processing portion 26 subsequently captures the image within the reference pattern frame out of the images B with the newly set range of the reference pattern frame as the reference pattern image capture range, and updates the reference pattern image with that image (step S132). And it returns to the step S114 to repeat the processes from the step S114 onward.

The above processing updates the reference pattern image to an appropriate image according to the position and size of the follow-up target as the focusing target on the screen so that the target is appropriately followed by the pattern matching.

According to the processing, the size of the AF area (AF frame) is set to the size irrelevant to updating of the reference pattern frame. It is also possible, however, to change the size of the AF area in conjunction with the size of the reference pattern frame (to match with the size of the reference pattern frame for instance).

The description exemplified the case where the target moves to the right and left or the like on the screen. However, this process is also effective in the case where only the size of the image of the target changes when the target moves to and fro for instance.

In the case of setting the reference pattern frame based on the binary accumulated projection, the processing sets the range of the reference pattern frame to the range of the total of the horizontal accumulated values and the total of the vertical accumulated values of 1 to 99 percent respectively. However, it is not limited thereto. For instance, it may be a range of another percent.

Next, a description will be given by using a flowchart of FIG. 10 as to the case where, on setting the initial reference pattern image in the step S112 of FIG. 6, the reference pattern frame for capturing the reference pattern image is automatically settable to an appropriate range as with the process of updating the reference pattern frame of FIG. 6.

Figure 6:
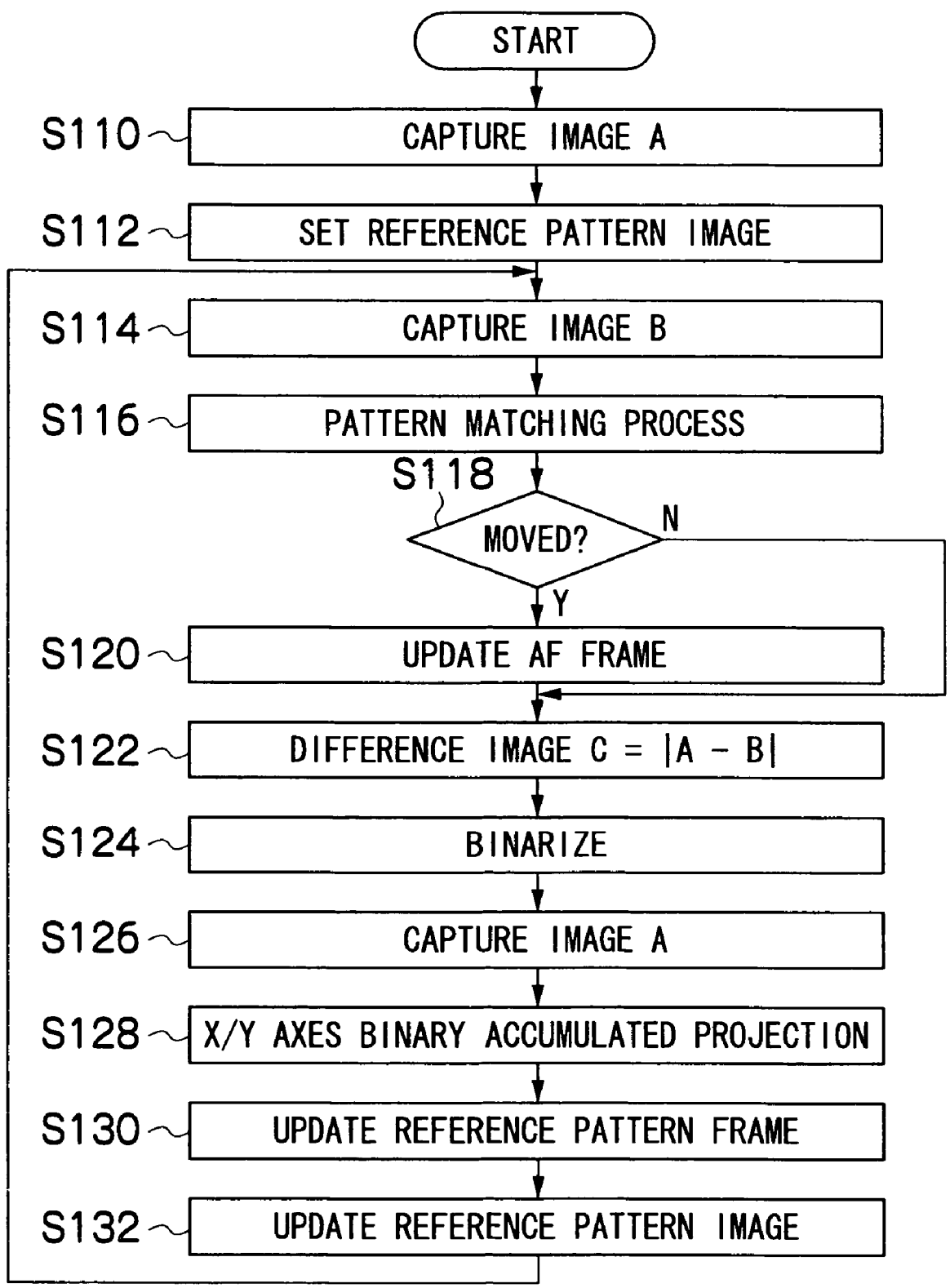
FIG. 6 is a flowchart showing the procedure of the follow-up process of the follow-up apparatus.

As described in the flowchart of FIG. 6, if the instruction for setting the reference pattern image is provided, the image processing portion 26 captures the photographing image (image A) equivalent to one screen from the image input portion 28 (step S110 of FIG. 6). And it moves on to the step S112 of FIG. 6 and starts the process of the flowchart of FIG. 10 as the process of the step S112.

Figure 10:
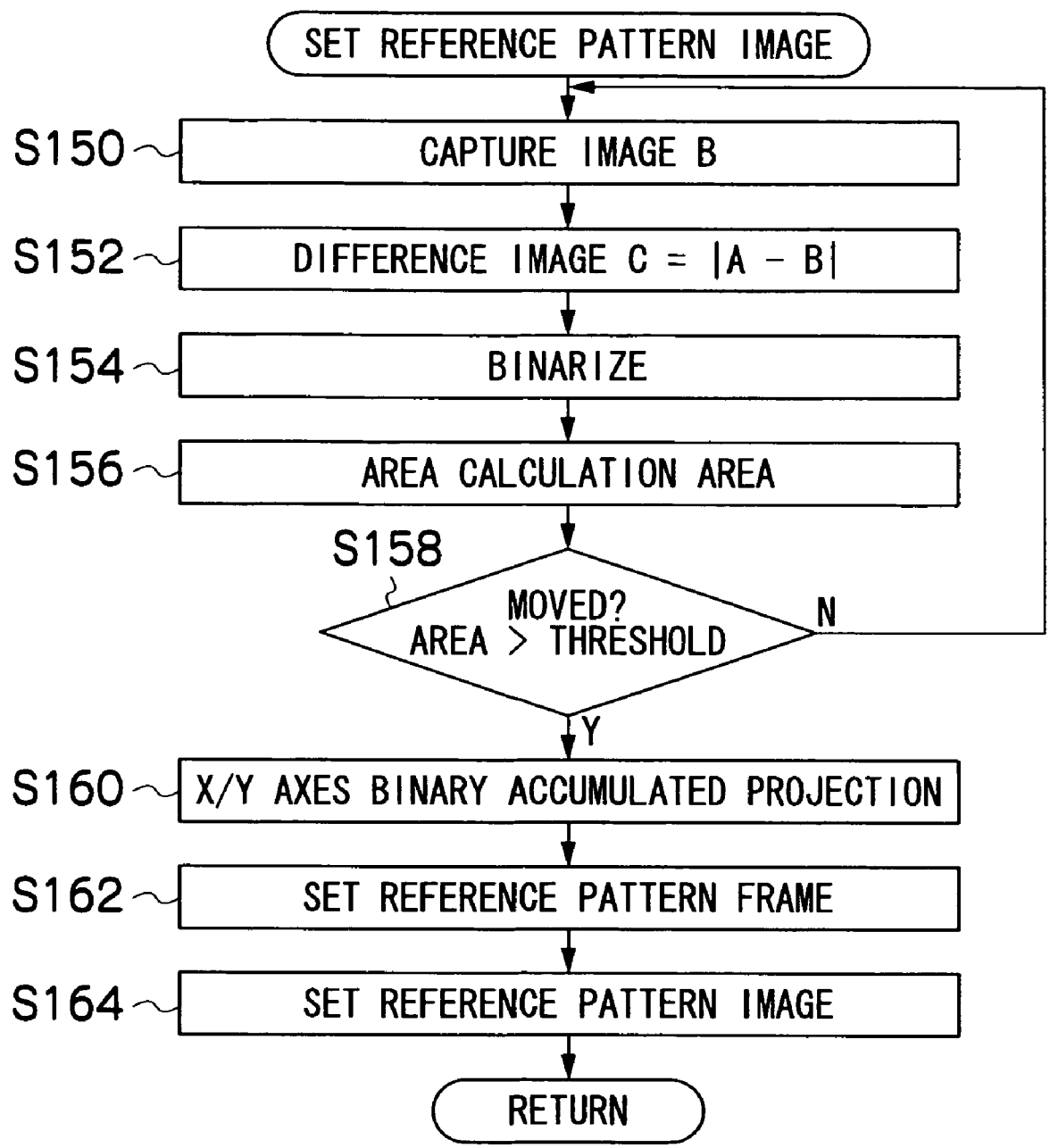
FIG. 10 is a flowchart showing an embodiment of a process relating to setting of an initial reference pattern image.

On moving to the process of the flowchart of FIG. 10, the image processing portion 26 newly captures the photographing image equivalent to one screen as the image B from the image input portion 28 (step S150). The image processing portion 26 subsequently generates the difference image C extracted by a difference between the image A and the image B as with the step S122 of FIG. 6 (step S152). It subsequently binarizes the difference image C as with the step S124 of FIG. 6 (step S154) and acquires the area of the binarized difference image C (step S156). The acquired area is represented by a variable AREA. Next, the image processing portion 26 determines whether or not the target has moved according to whether or not the area AREA has exceeded the predetermined threshold (500 for instance) (step S158). If determined as NO in the step S158, it repeatedly performs the processes of the steps S150 to S158.

If determined as YES in the step S158, the image processing portion 26 performs the process of the binary accumulated projection to the binarized difference image C as with the step S128 of FIG. 6 (step S160). The image processing portion 26 subsequently sets the reference pattern frame based on the results of the binary accumulated projection to the X-axis and Y-axis as with the step S130 of FIG. 6 (step S162). Once the reference pattern frame is set, it captures the image in the reference pattern frame out of the images B, and sets the reference pattern image with that image (step S164). On finishing the process of the step S164, it moves on to the step S114 of FIG. 6.

According to the above processing, the initial reference pattern image is set by the image in the appropriate range according to the position and size of the follow-up target as the focusing target on the screen.

The process of initialization of the reference pattern image shown in FIG. 10 is applicable even in the case where the reference pattern image is not updated as in FIG. 6.

As described above, the embodiment shows the lens apparatus 12, frame operating portion 14 and follow-up apparatus 16 as separate apparatuses. However, any two or the entirety of them may be an integrated apparatus. The embodiment provides the operating members (a decision switch for deciding the target, for instance) relating to the processing of the follow-up apparatus 16 to the frame operating portion 14. It is also possible, however, to provide them to the follow-up apparatus 16.

According to the embodiment, the video signal is obtained for the AF by an AF-specific image pickup device separate from the image pickup device of the camera head 10. It is also possible, however, to use for the AF the video signal obtained by the image pickup device of the camera head 10. If the video signal for the AF is obtained from the AF-specific image pickup device as with the embodiment, it is possible, in the case where the camera head 10 supports the high-definition (HD) television system, to perform the AF without using the HD signal thereof, which is advantageous as to the miniaturization and power saving.

The embodiment described the case of adopting the AF of the contrast method. It is also possible, however, to apply the present invention in the case of adopting the AF other than the contrast method.

Figure 11:
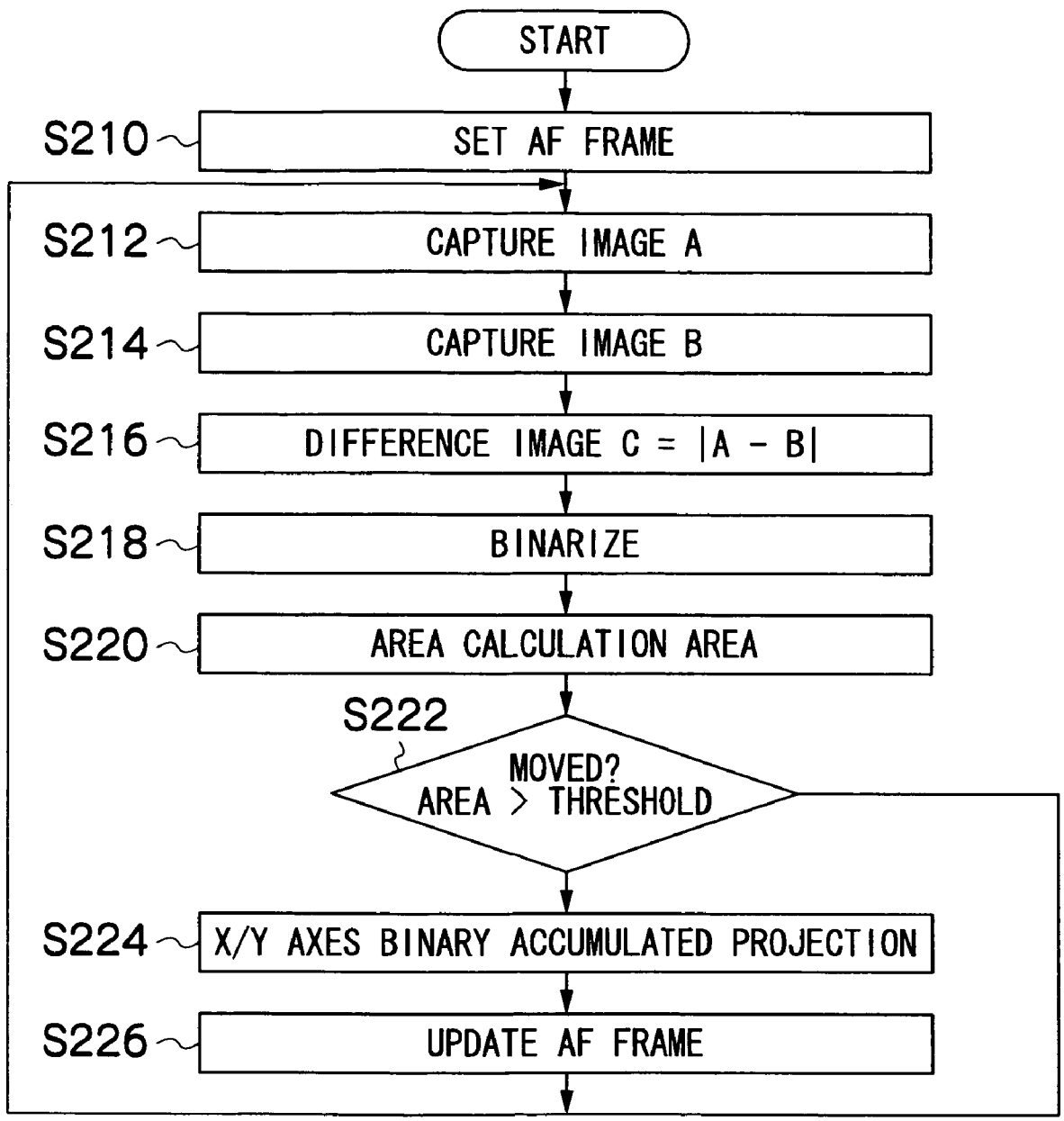
FIG. 11 is a flowchart showing the procedure of the follow-up process of the follow-up apparatus.

Next, a detailed description will be given by referring to a flowchart of FIG. 11 as to the follow-up process by the image processing portion 26 of the follow-up apparatus 16. First, the operator manipulates the operating member of the frame operating portion 14 while watching the video and AF frame displayed on the screen of the view finder 18, and sets the range of the AF frame so as to fit the follow-up target as the focusing target in the range of the AF frame (step S210). Thus, the target is brought into focus by the AF processing of the lens CPU 20.

If the operation of the frame operating portion 14 stops, the image processing portion 26 reads the AF frame information indicating the set contents of the AF frame at that time from the frame operating portion 14 via the serial communication interface 30, and also captures the photographing image (image data) equivalent to one screen (one frame) from the video signal provided from the AF processing portion 22 of the lens apparatus 12 to the image input portion 28 (step S212). The photographing image captured in this case is referred to as an image A. If the video signal provided from the AF processing portion 22 to the image input portion 28 is an interlace video signal configuring the photographing image equivalent to one screen (equivalent to one frame) with the video signal equivalent to two fields for instance, the photographing image captured as one screen from the image input portion 28 may be either the photographing image obtainable by the video signal equivalent to one field or that obtainable by the video signal equivalent to two fields. In the case of a non-interlace method, the photographing image is obtainable by the video signal equivalent to one frame.

Next, the image processing portion 26 captures the photographing image equivalent to one screen as with the image A after a predetermined time has elapsed since the capture of the image A (step S214). The image captured in this case is referred to as an image B.

Figure 12:
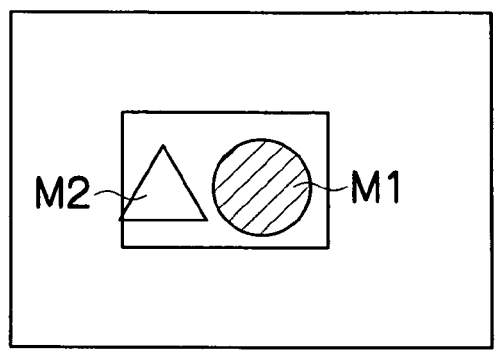
FIG. 12 is a schematic diagram used for a description of the difference image.
Figure 12:
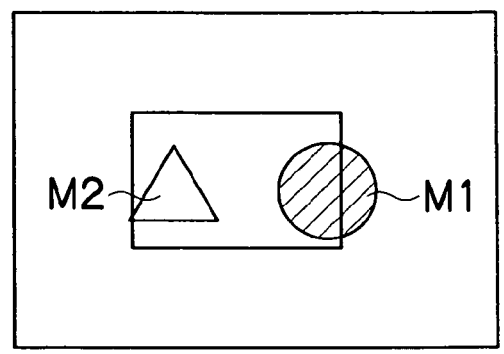
Figure 12:
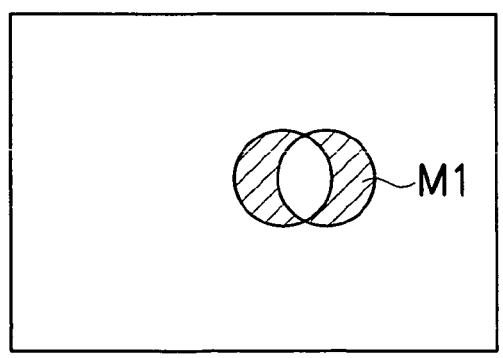

Next, the image processing portion 26 generates a difference image C extracted by a difference between the image A and the image B (step S216). To be more specific, it acquires the difference in pixel value (luminance value) between mutually corresponding pixels of the image A and the image B, and generates the difference image C having an absolute value of the difference as the pixel value of each individual pixel (C=|A−B|). For instance, the images shown in FIGS. 12A and 12B are obtained as the image A and the image B respectively. FIGS. 12A and 12B have the AF frame 40 set in the step S210, in which a moving object M1 moving on the screen is shown as the follow-up target (M1) and simply as a circular image at a fixed luminance, and one non-target M2 is shown as a triangular image and as a changeless subject on the screen. The subjects outside the AF frame 40 have no change in the image and so they are omitted. As against the images A and B, the difference image C is generated as an image like FIG. 12. As shown in FIG. 12, the difference image C has a changeless image eliminated and has only the image of the portion in which the image of the moving object M is not overlapping between the image A and the image B extracted.

Figure 13A:
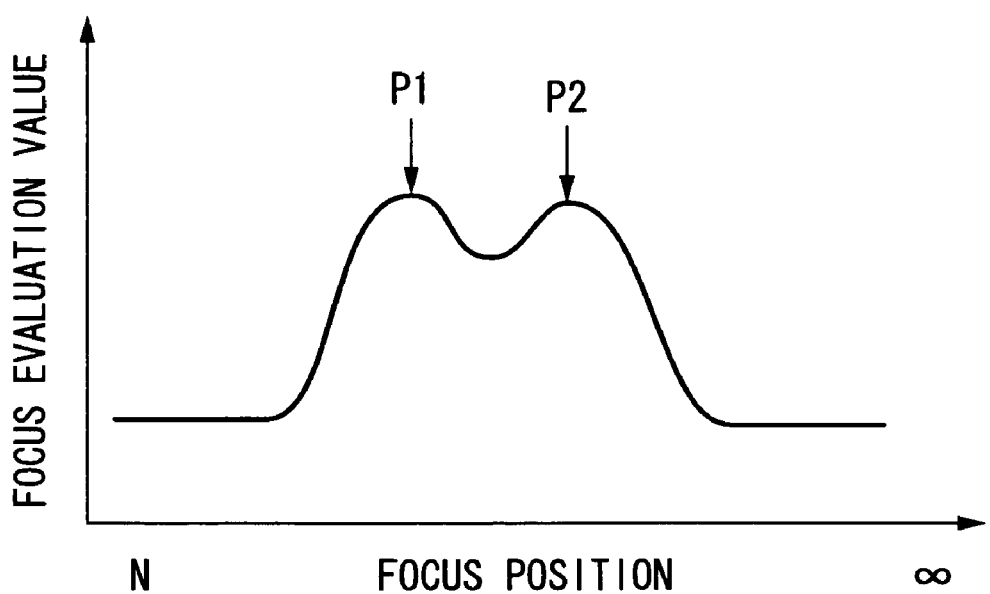
FIGS. 13A and 13B are diagrams showing examples of focus evaluation values according to the AF frame.

Here, if the contrast between the target M1 and the non-target M2 is high (a lot of high-frequency components) in the case where the AF frame 40 is set as in the image B of FIG. 12, the distribution of the focus evaluation values is as shown in FIG. 13A when the position of the focus lens group is moved in the range from a closeup end to an infinite end. According to this, there are two peaks P1, P2 correspondingly to the respective subject distances of the target M1 and the non-target M2, and so the AF brings one of the subjects into focus. For that reason, there is a possibility that the non-target M2 may be brought into focus, in which case the target M1 intended by the operator is not brought into focus. Therefore, according to the processing of this flowchart, the range (position and size) of the AF frame 40 is automatically changed to fit the range of the target M1.

On generating the difference image C in the step S216, as to the pixel value of each individual pixel of the difference image C, the image processing portion 26 sets it to 1 if equal to or over the predetermined threshold and to 0 if less than the threshold so as to binarize the difference image C (step S218). It acquires the area of the binarized difference image C (step S220). The acquired area is represented by a variable AREA. Next, the image processing portion 26 determines whether or not the target has moved according to whether or not the area AREA has exceeded the predetermined threshold (500 for instance) (step S222). If determined as NO, it returns to the step S212 without performing the processes of the steps S224 and 226 and repeats the processes from the step S212 onward.

If determined as YES in the step S222, the image processing portion 26 performs the process of the binary accumulated projection to the binarized difference image C (step S224).

Figure 14:
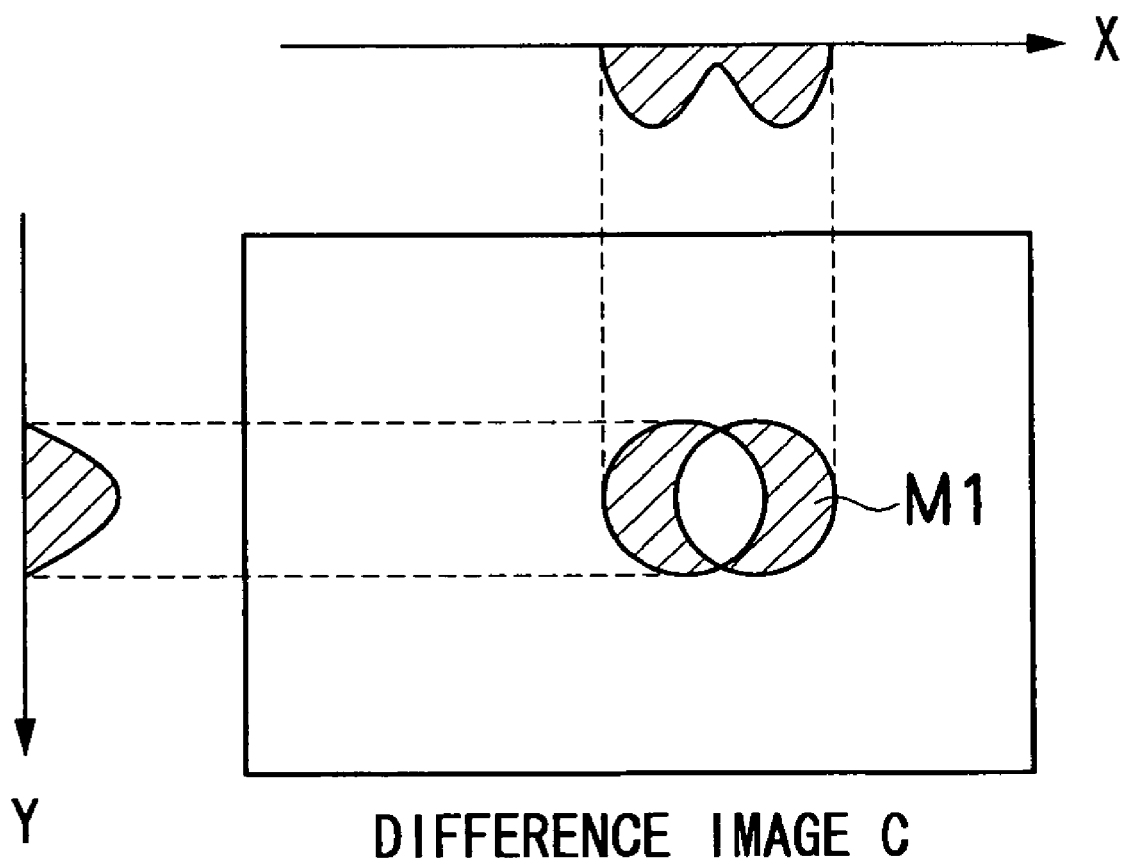
FIG. 14 is a schematic diagram used for a description of the process of the binary accumulated projection.

Here, the process of the binary accumulated projection will be described. The binary accumulated projection acquires the horizontal accumulated values having accumulated (integrated) the pixel values of the pixels arranged on the same horizontal (lateral) line as against the pixels of the binarized difference image C and the vertical accumulated values having accumulated the pixel values of the pixels arranged on the same vertical (lengthwise) line, and projects the horizontal accumulated value and the vertical accumulated value of each individual line on the Y-axis (longitudinal axis) and the X-axis (abscissa axis) assumed on the screen respectively. It thus creates binary accumulated projection distributions for showing the distributions of the horizontal accumulated values and vertical accumulated values on the Y-axis and the X-axis respectively. For instance, if the process of the binary accumulated projection is performed to the difference image C generated as in FIG. 12, the result as in FIG. 14 is obtained. In FIG. 14, each individual coordinate point (x-coordinate value) of the X-axis has the vertical accumulated value having accumulated the pixel values of the pixels of the same x-coordinate value (pixels arranged on the same vertical line) projected thereon, and each individual coordinate point (y-coordinate value) of the Y-axis has the horizontal accumulated value having accumulated the pixel values of the pixels of the same y-coordinate value (pixels on the horizontal line) projected thereon.

Figure 13B:
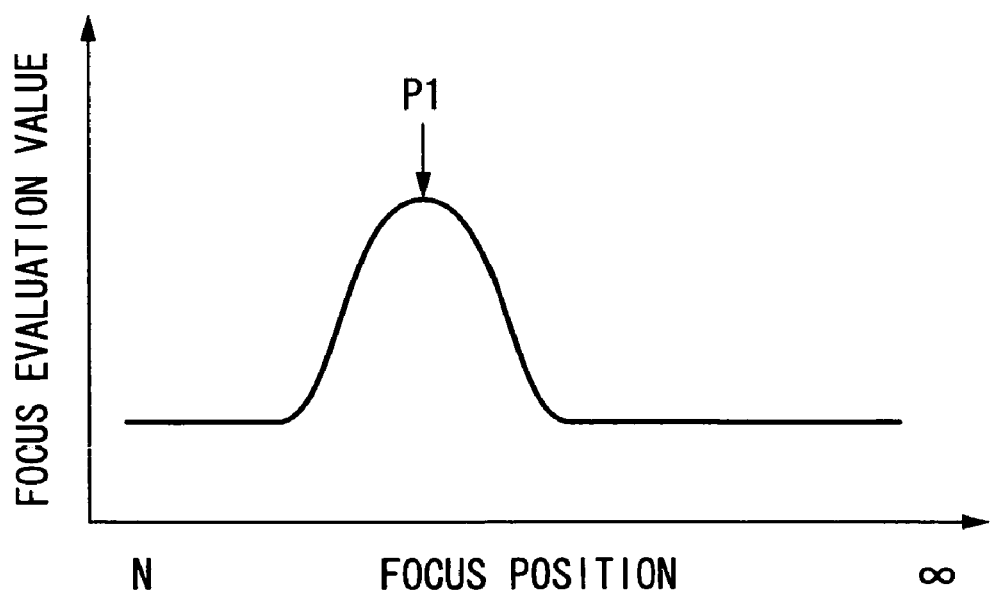
Figure 15A:
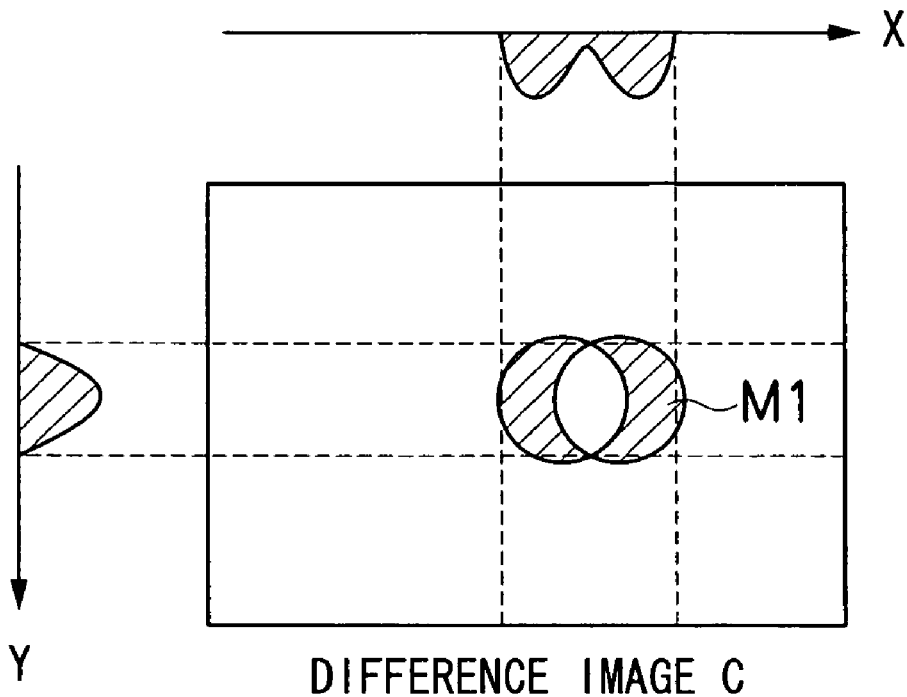
FIGS. 15A and 15B are schematic diagrams used for a description of setting (updating) of the AF frame.
Figure 15B:
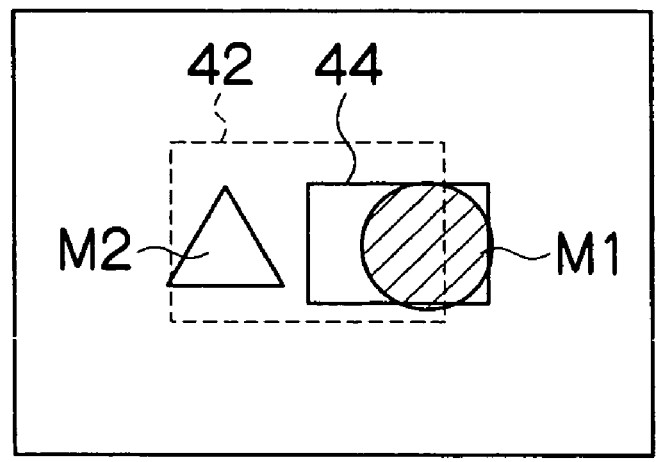

Next, the image processing portion 26 updates the AF frame based on the results of the binary accumulated projection to the X-axis and Y-axis in the step S224 (step S226). For instance, it sets a rectangular AF frame by setting horizontal width of the AF frame to the range of values of 1 to 99 percent to the total (area) of the vertical accumulated values projected on the X-axis (the range excluding the range of the value equivalent to 1 percent of the area from the left end and right end of the screen respectively) and setting vertical width of the AF frame to the range of values of 1 to 99 percent to the total (area) of the horizontal accumulated values projected on the Y-axis (the range excluding the range of the value equivalent to 1 percent of the area from the upper end and lower end of the screen respectively). For instance, if the distribution of the binary accumulated projection as shown in FIG. 14 is acquired, an AF frame 44 as shown in FIG. 15A is set. The image processing portion 26 transmits the AF frame information indicating the range (position and size) of the AF frame thus set up to the frame operating portion 14 via the serial communication interface 30 so as to change the AF target range of the lens apparatus 12 and the AF frame displayed on the view finder 18. According to this, as shown in FIG. 15B, the AF frame 40 set up in the range including the target M1 and non-target M2 before updating the AF frame is changed to the AF frame 44 mainly including the image of the target M1. Therefore, as shown in FIG. 13B, only the peak P1 corresponding only to the target M1 exists in the distribution of the focus evaluation values when the position of the focus lens group (focus position) is moved in the range from the closeup end to the infinite end. Thus, it becomes possible to securely bring the target M1 into focus.

On completing the above processing, the image processing portion 26 returns to the step S212 and repeatedly performs the processes from the step S212 onward. Thus, even when the position and size of the target M1 on the screen change, the position and size of the AF frame are automatically changed accordingly so as to be in the appropriate range.

In the case of setting the range of the AF frame based on the binary accumulated projection, the processing sets the range of the AF frame to the range of the total of the horizontal accumulated values and the total of the vertical accumulated values of 1 to 99 percent respectively. However, it is not limited thereto. For instance, it may be a range of another percent.

The description exemplified the case where the target moves to the right and left on the screen. However, this process is also effective in the case where only the size of the image of the target changes when the target moves to and fro for instance.

The embodiment shows the lens apparatus 12, frame operating portion 14 and follow-up apparatus 16 as separate apparatuses. However, any two or the entirety of them may be an integrated apparatus. The embodiment provides the operating members (the decision switch for deciding the target, for instance) relating to the processing of the follow-up apparatus 16 to the frame operating portion 14. It is also possible, however, to provide them to the follow-up apparatus 16.

According to the embodiment, the video signal is obtained for the AF by an AF-specific image pickup device separate from the image pickup device of the camera head 10. It is also possible, however, to use for the AF the video signal obtained by the image pickup device of the camera head 10. If the video signal for the AF is obtained from the AF-specific image pickup device as with the embodiment, it is possible, in the case where the camera head 10 supports the high-definition (HD) television system, to perform the AF without using the HD signal thereof, which is advantageous as to the miniaturization and power saving.

What is claimed is:

1. An auto focus system comprising:
a reference pattern image acquisition range setting device which sets a reference pattern image acquisition range for acquiring a reference pattern image showing an image of a target subject to be followed in a range of a photographing image to be taken by a camera;
a reference pattern image storing device which acquires an image in the reference pattern image acquisition range set by the reference pattern image acquisition range setting device and stores the acquired image as the reference pattern image;

a reference pattern image position detecting device which detects a position of an image matching with the reference pattern image stored by the reference pattern image storing device as against the photographing images sequentially taken by the camera;

an auto focus device which changes a focusing target position based on the position detected by the reference pattern image position detecting device to have the position of the target subject followed by the focusing target position within a photographing range of the camera, and adjusts a focus of an optical system of the camera to bring the target subject into focus;

a reference pattern image acquisition range position changing device which changes the position of the reference pattern image acquisition range based on the position detected by the reference pattern image position detecting device to have the position of the target subject followed by the position of the reference pattern image acquisition range set by the reference pattern image acquisition range setting device; and a reference pattern image acquisition range size changing device which changes a size of the reference pattern image acquisition range set by the reference pattern image acquisition range setting device according to the size of the image of the target subject in the photographing image of the camera;

wherein the reference pattern image acquisition range size changing device changes the size of the reference pattern image acquisition range only in the case where the size of the image of the target subject in the photographing image of the camera becomes smaller than an initial size.

2. The auto focus system according to claim 1, wherein the change of the size of the reference pattern image acquisition range by the reference pattern image acquisition range size changing device is performed based on at least one of a subject distance brought into focus by the optical system of the camera and a focal length of the optical system.

3. The auto focus system according to claim 1, wherein the auto focus device renders the focusing target as the subject in the range of an AF area set up within the photographing range of the camera and also changes the position of the AF area as the focusing target position.

4. The auto focus system according to claim 1, wherein the reference pattern image acquisition range setting device includes a specifying device which specifies desired position and size of the reference pattern image acquisition range set first.

5. An auto focus system comprising:

a reference pattern image acquisition range setting device which sets a reference pattern image acquisition range for acquiring a reference pattern image showing a target subject to be followed in a range of a photographing image to be taken by a camera;

a reference pattern image storing device which acquires an image in the reference pattern image acquisition range set by the reference pattern image acquisition range setting device and storing the acquired image as the reference pattern image;

a reference pattern image position detecting device which detects a position of an image matching with the reference pattern image stored by the reference pattern image storing device as against the photographing images sequentially taken by the camera;

an auto focus device which changes a focusing target position based on the position detected by the reference pattern image position detecting device to have the position of the target subject followed by the focusing target position within a photographing range of the camera, and adjusts a focus of an optical system of the camera to bring the target subject into focus; and a reference pattern image size changing device which changes a relative size of the reference pattern image in the photographing image of the camera stored by the reference pattern image storing device according to the size of the image of the target subject in the photographing image of the camera;

wherein the change of the size of the reference pattern image by the reference pattern image size changing device is performed based on at least one of a subject distance brought into focus by the optical system of the camera and a focal length of the optical system, and wherein the reference pattern image acquisition range size changing device changes the size of the reference pattern image acquisition range only in the case where the size of the image of the target subject in the photographing image of the camera becomes smaller than an initial size.

6. The auto focus system according to claim 5, wherein the auto focus device renders the focusing target as the subject in the range of an AF area set up within the photographing range of the camera and also changes the position of the AF area as the focusing target position.

7. The auto focus system according to claim 5, wherein the reference pattern image acquisition range setting device includes a specifying device which specifies desired position and size of the reference pattern image acquisition range set first.

8. An auto focus system comprising:

an image pickup device which images a subject image focused by an optical system;

a reference pattern image storing device which stores as a reference pattern image an image of a target subject to be followed as a focusing target;

a reference pattern image position detecting device which detects an image matching with the reference pattern image stored by the reference pattern image storing device on a screen of a photographing image acquired by the image pickup device and detects a position of the detected image on the screen;

an auto focus device which adjusts a focus of the optical system to bring into focus the subject at the position detected by the reference pattern image position detecting device;

a difference image generating device which extracts a difference between two photographing images acquired sequentially by the image pickup device to generate a difference image;

a reference pattern image capture range setting device which sets a reference pattern image capture range for capturing the reference pattern image from the photographing images acquired by the image pickup device based on the difference image generated by the difference image generating device;

a reference pattern image capturing device which captures as the reference pattern image an image in the reference pattern image capture range set by the reference pattern image capture range setting device from the photographing images acquired by the image pickup device; and a reference pattern image setting device which sets the reference pattern image captured by the reference pattern image capturing device as the reference pattern image to be stored by the reference pattern image storing device,
wherein the reference pattern image capture range setting device includes a binarizing device which binarizes the difference image generated by the difference image generating device and an accumulated value calculating device which calculates a distribution of accumulated values having accumulated pixel values of the pixels horizontally and a distribution of accumulated values having accumulated the pixel values of the pixels vertically as to the pixels of the difference image binarized by the binarizing device so as to set the reference pattern image capture range based on the distributions of the accumulated values calculated by the accumulated value calculating device.

9. The auto focus system according to claim 8, wherein the reference pattern image setting device is a device which updates the reference pattern image stored by the reference pattern image storing device with the reference pattern image captured by the reference pattern image capturing device.

10. The auto focus system according to claim 8, wherein the reference pattern image setting device sets an initial reference pattern image to be stored by the reference pattern image storing device with the reference pattern image captured by the reference pattern image capturing device.

11. The auto focus system according to claim 8, wherein the auto focus device adopts an auto focus of a contrast method and adjusts the focus based on a contrast of the image in the range of a predetermined AF area out of the photographing images acquired by the image pickup device and also sets the position of the AF area at the position detected by the reference pattern image position detecting device.

12. An auto focus system comprising:
an image pickup device which images a subject image focused by an optical system;
an auto focus device which adjusts a focus of the optical system to bring a subject in a predetermined AF area into focus based on a contrast of an image of the subject in the AF area out of photographing images imaged by the image pickup device;
a difference image generating device which extracts a difference between two photographing images acquired sequentially by the image pickup device to generate a difference image;
a detecting device which detects an image range of a moving object moving on a screen as an image range of a target subject to be brought into focus based on the difference image generated by the difference image generating device; and
an AF area setting device which sets a position and a size of the AF area so as to have the image of the target subject mainly included in the range of the AF area based on the image range detected by the detecting device,
wherein the detecting device includes a binarizing device which binarizes the difference image generated by the difference image generating device and an accumulated value calculating device which calculates a distribution of horizontal accumulated values having accumulated pixel values of pixels horizontally and a distribution of vertical accumulated values having accumulated the pixel values of the pixels vertically as to the pixels of the difference image binarized by the binarizing device so as to detect the image range of the target subject based on the distributions of the horizontal accumulated values and the vertical accumulated values calculated by the accumulated value calculating device.

13. The auto focus system according to claim 12, wherein the AF area setting device sets a rectangular AF area, sets a horizontal width of the AF area based on a distribution range of the vertical accumulated values calculated by the accumulated value calculating device and also sets a vertical width of the AF area based on a distribution range of the horizontal accumulated values calculated by the accumulated value calculating device.

* * * * *